US006535888B1

(12) United States Patent
Vijayan et al.

(10) Patent No.: US 6,535,888 B1
(45) Date of Patent: Mar. 18, 2003

(54) METHOD AND SYSTEM FOR PROVIDING A VISUAL SEARCH DIRECTORY

(75) Inventors: Madhu Vijayan, Topanga, CA (US); Sassan Behzadi, Los Angeles, CA (US)

(73) Assignee: Oxelis, Inc., Santa Monica, CA (US)

( * ) Notice: Subject to any disclaimer, the term of this patent is extended or adjusted under 35 U.S.C. 154(b) by 277 days.

(21) Appl. No.: 09/618,983

(22) Filed: Jul. 19, 2000

(51) Int. Cl.[7] .............................................. G06F 17/30
(52) U.S. Cl. ........................ 707/104; 707/100; 707/102
(58) Field of Search ............................ 707/104, 102, 707/3, 1, 2, 6, 7, 10

(56) References Cited

U.S. PATENT DOCUMENTS 5,895,454 A * 4/1999 Harrington .................... 705/26
5,949,411 A * 9/1999 Doerr et al. .................. 345/716

OTHER PUBLICATIONS

Printout from ePOD.com website—dated Jul. 27, 2000.
Printout from Scour.phtml website—Jul. 27, 2000.
Printout from Twirlix.com website—date Jul. 27, 2000.
Printout from Ditto.com website—Jul. 27, 2000.
Printout from KView.com website—Jul. 27, 2000.
Printout from Qarbon.com website—dated Jul. 27, 2000.
Printout from pcshowand tell.com website—dated Jul. 27, 2000.

* cited by examiner

Primary Examiner—Sanjiv Shah
(74) Attorney, Agent, or Firm—Christie, Parker & Hale, LLP

(57) ABSTRACT

A system and method for visually and functionally extending the reach of web sites includes a plurality of interactive, animated, multimedia previews of web sites organized into a searchable database. The searchable database is stored on a central server and forms the backend of a visual search directory. Users access the database through an interface that allows them to perform a search and receive results from the search in the form of animated, multimedia previews of relevant web sites.

13 Claims, 47 Drawing Sheets

METHOD AND SYSTEM FOR PROVIDING A VISUAL SEARCH DIRECTORY

FIELD OF THE INVENTION

The present invention relates generally to a method and system for visually and functionally extending the reach of web sites, and more particularly, to a method and system for visually and functionally extending the reach of web sites through the use of interactive, multimedia previews deployed in a variety of online applications.

BACKGROUND OF THE INVENTION

While the Internet has transformed from a niche technology into a mass communication and commerce medium, many web sites remain too complex for the average individual to effectively and efficiently use. As more and more consumers and potential consumers come online for the first time, there is an increasing need for some instruction or education by web sites to ensure that their initial experiences online are enjoyable and productive. Many first-time users presently turn to offline sources—such as books like BUYING ONLINE FOR DUMMIES and THE COMPLETE IDIOT'S GUIDE TO ONLINE SHOPPING for this instruction or education.

Another common frustration voiced by consumers and potential consumers is that it is becoming increasingly difficult to efficiently find what they are looking for as the World Wide Web continues to grow at an exponential rate. For example, a recent search for "toys" on Yahoo generated over 2500 matching results, with BIRD-E-TOYS.COM appearing at the top of the list. Studies have shown that online users are generally more interested in the quality, rather than the quantity of the results returned by search engines and directories. A recent MEDIAMETRIX report showed that almost 40% of the total time spent of the Web is spent at the 100 most popular sites on the Web. This trend is even more evident when focusing solely on consumers—the top 50 sites accounted. for almost three-quarters of the revenue generated by consumers online in 1988. As a result, a consumer or potential consumer searching on Yahoo for some of the most recognized online toy brands—like ETOYS, TOYSRUS, and FAO SCHWARTZ—would have to wade through hundreds or irrelevant results to find those sites.

Even when a consumer or potential consumer is able to locate popular e-commerce sites using YAHOO or another conventional search directory or engine, it is impossible to develop any appreciation for the breadth or depth of those sties through the text-based, static manner in which results are presented. For example, when ETOYS appears in search results on YAHOO, the only information that is presented to a consumer or potential consumer is a hyperlink to ETOYS home page, and the following description of the site: "Web-based retailer focused exclusively on children's products, including toys, video games, software, videos, and music." Text-based, static results such as these are not very likely to grab the attention of consumers or potential consumers, nor are the likely to provide any insight into the features and services of the web site.

Consumers and potential consumers are not alone in their frustration. In an increasingly competitive market online, companies—especially e-tailers—know that they must visually and functionally extend the reach of their sites to attract new visitors and convert those visitors into consumers. The ability to extend the reach of a site becomes particularly important as consumers and potential consumers continue to converge on fewer and fewer web sites. Moreover, the traditional methods companies have utilized to extend the reach of their sites—such as banner advertisements—have simply not proved effective. This is hardly surprising given the fact that traditional banner ads are simply unable to convey to consumers and potential consumers the interactive nature and multimedia content that increasing defines the online experience. As a result, companies—who spent approximately $5.5 billion in online advertising in 1999—are looking for alternative, more effective ways to attract new consumers online. For example, many companies are turning to rich media advertising in an attempt to attract new visitors to their sites. While rich media advertising will likely increase the return on investment for online advertisers, simply converting traditional banner advertisements into rich media advertisements may not be enough to grab the attention of new consumers and potential consumers if they are still not able to truly experience the breadth and depth of a site, product or service offering through that advertisement.

Accordingly, a need exists for an improved method and system for online companies to visually and functionally extend the reach of their sites, and more particularly, for doing so while simultaneously consumers and potential consumers with (1) the instruction or education they need to make their initial online experiences enjoyable and (2) an appreciation for the breadth and depth of those sites, products or service offerings.

SUMMARY OF THE INVENTION

Therefore, the present invention provides an improved method and systems for online companies to visually and functionally extend the reach of their sites. In a presently preferred embodiment, this is accomplished through the creation and deployment of self-playing, interactive, animated, multimedia previews of sites, products and services on the Web. A plurality of site previews and features are stored in a central database, from which they can be accessed and deployed in a variety of online applications. Site previews generally are animated, multimedia educational or instructional overviews of a web site that provide a user with basic information about the site's focus, arrangement, content and/or features. Site features are similar to site previews, but are generally designed to focus on more detailed attributes of a site, a product or service offering, and typically include certain integrated functional enhancements such as the ability to conduct secure transactions directly within feature, the ability to capture and track consumer and clickstream data directly within the feature, the ability to dynamically update the content contained within the feature, and the ability the interactively customize a product or service offered within the feature.

One of the unique advantages of the present invention is that the same site preview or feature can be simultaneously deployed in a variety of online applications. For example, in a presently preferred embodiment, all of the site previews and features are accessible through a visual search directory. In contrast to conventional search engines and directories wherein search results are provided in a text-based or static manner, the present invention provides for a visual search directory that provides users with search results in the form of self-playing, interactive, animated, multimedia previews and features. Additionally, the same previews and features deployed through the visual search directory can also be accessed through a variety of other online applications. For example, a site preview can be accessed directly from an advertiser's site, as it is integrated into their online customer support and service system. As such, it provides a more cost-effective solution for manner routine customer service questions that may not need to be immediately escalated to some version of live help, phone support or e-mail response provided by the advertiser. Moreover, the same site preview can also be accessed directly from a third party site through a standard banner ad that is served from an online banner ad network. The ability to deploy site previews and features in a variety of online applications enables online companies to better visually and functionally extend the reach of their sites.

BRIEF DESCRIPTION OF THE DRAWINGS

These and other features and advantages of the present invention will be appreciated as the same become better understood by reference to the following Detailed Description when considered in connection with the accompanying drawings, wherein.

Figure 1:
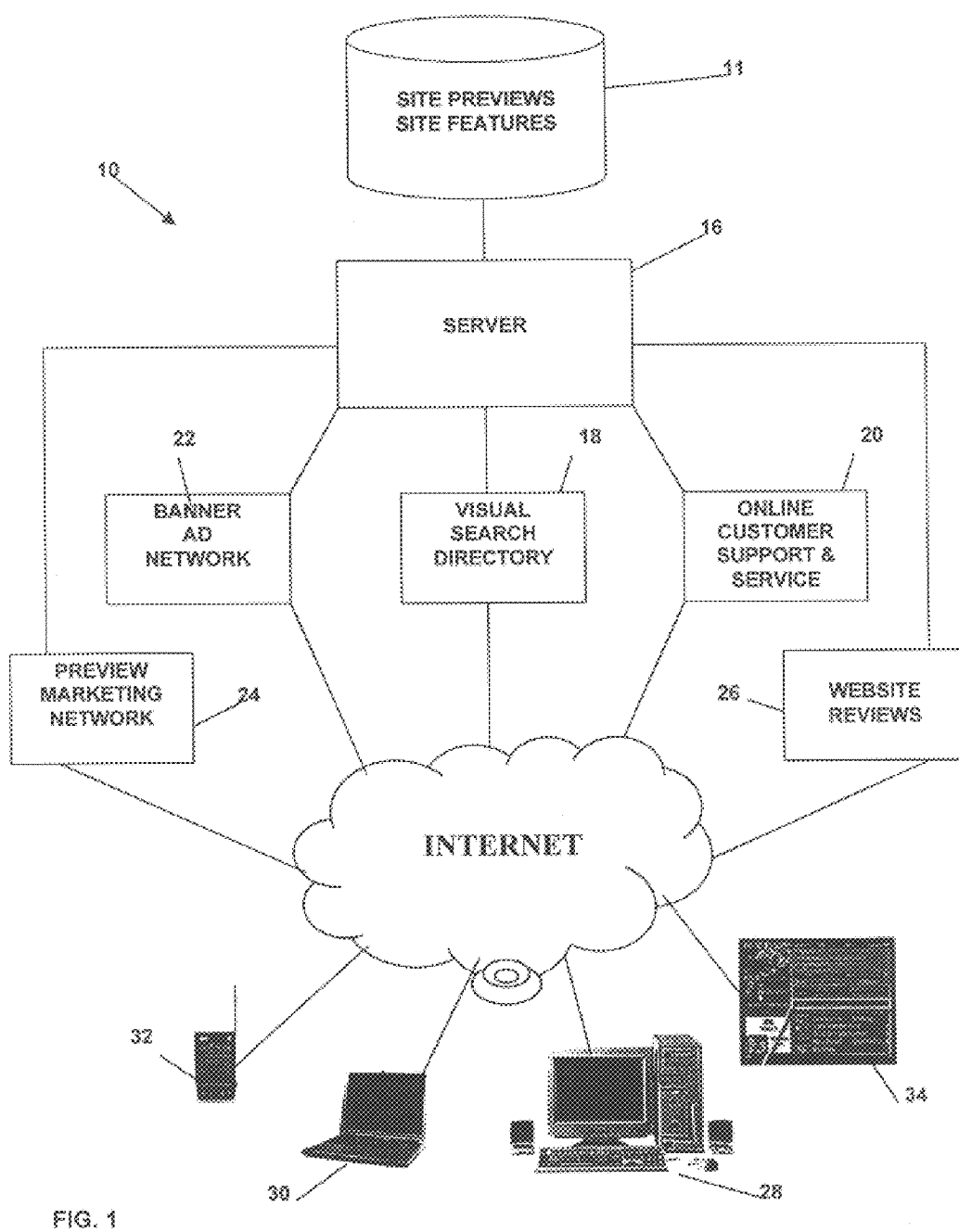
FIG. 1 is a block diagram illustrating a presently preferred embodiment of the system for visually and functionally extending the reach of web sites disclosed herein.
Figure 6A:
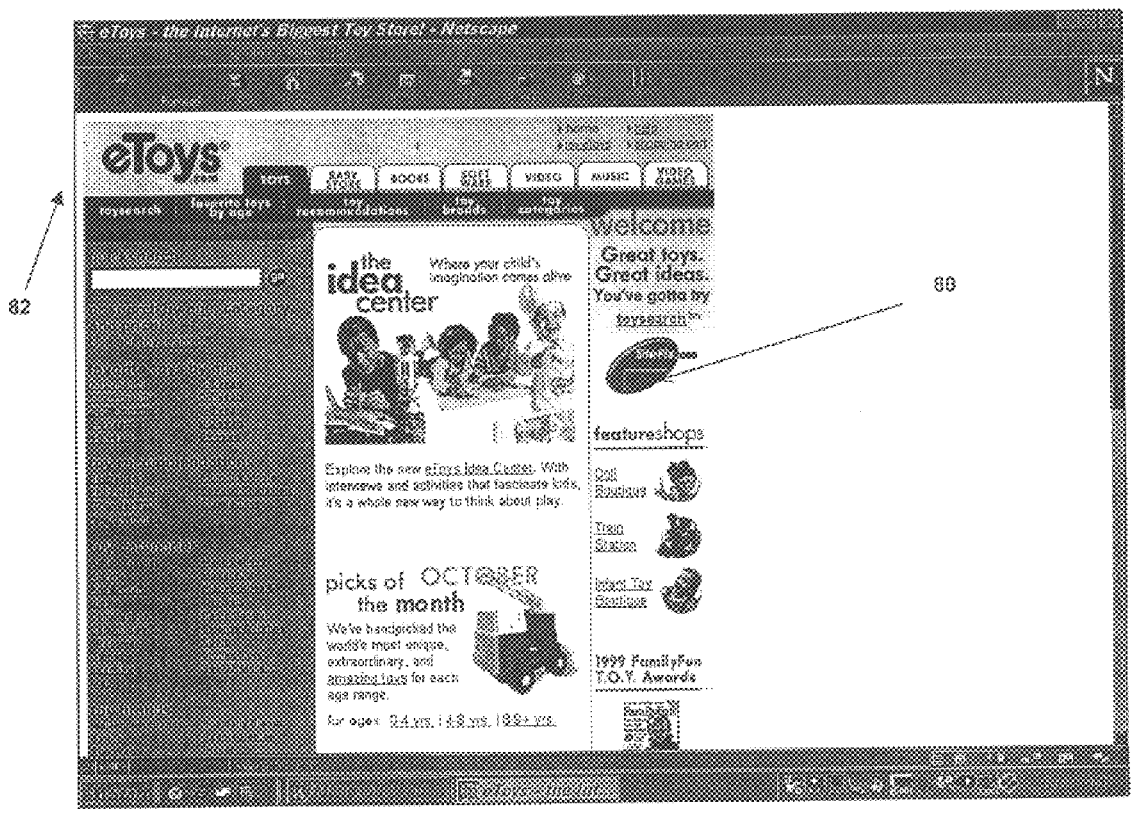
Figure 6B:
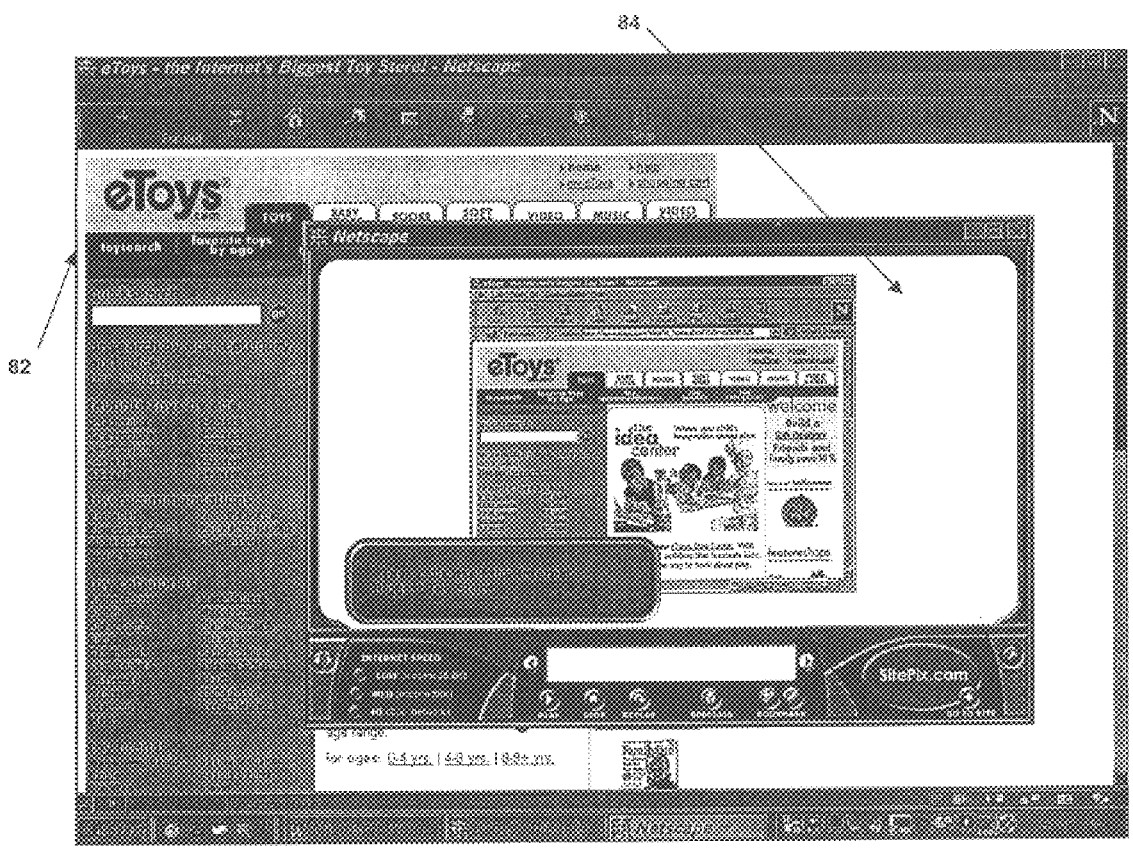
Figure 9A:
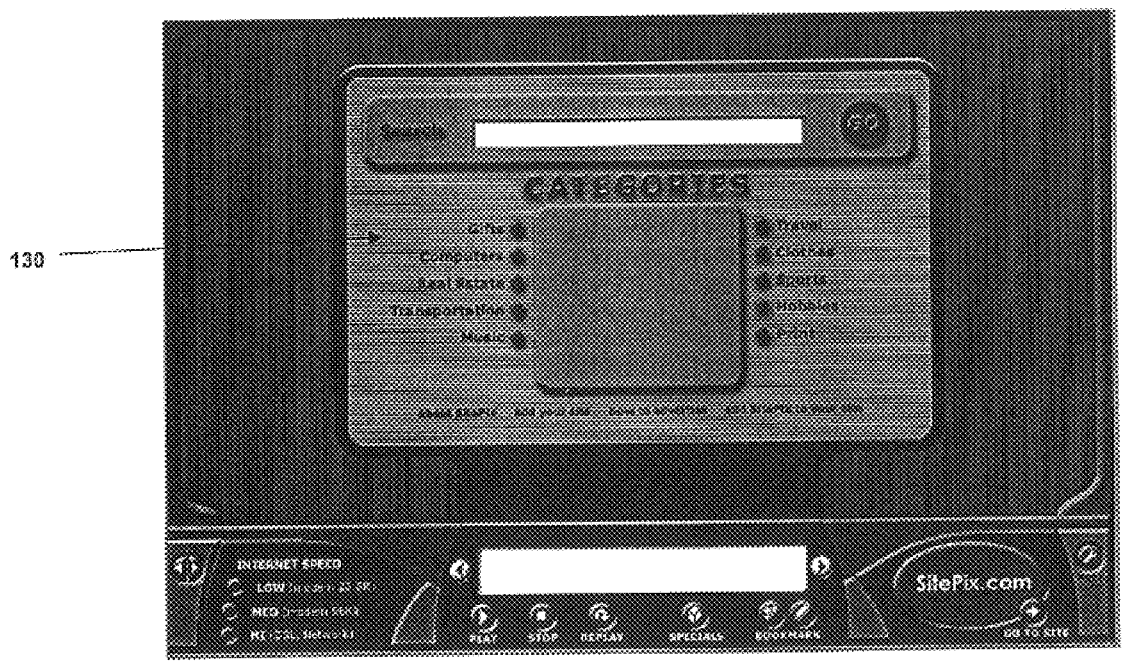
Figure 9B:
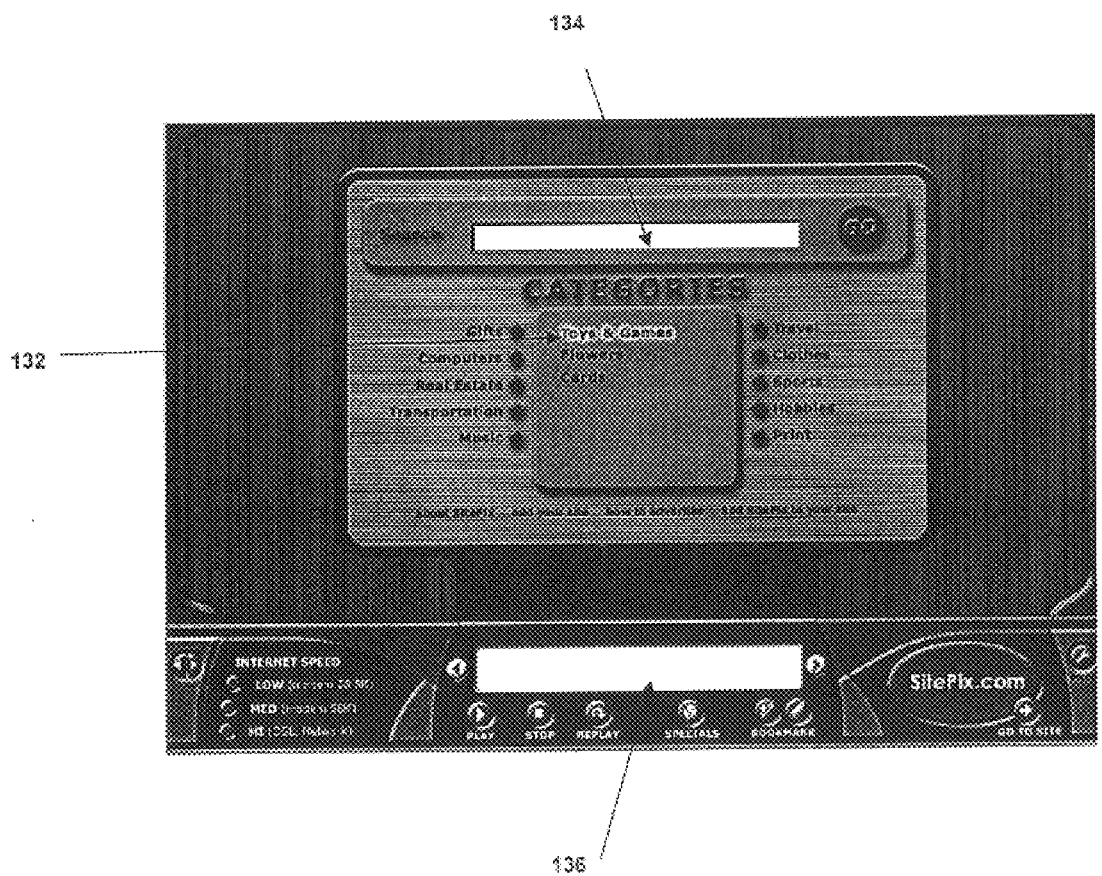
Figure 9C:
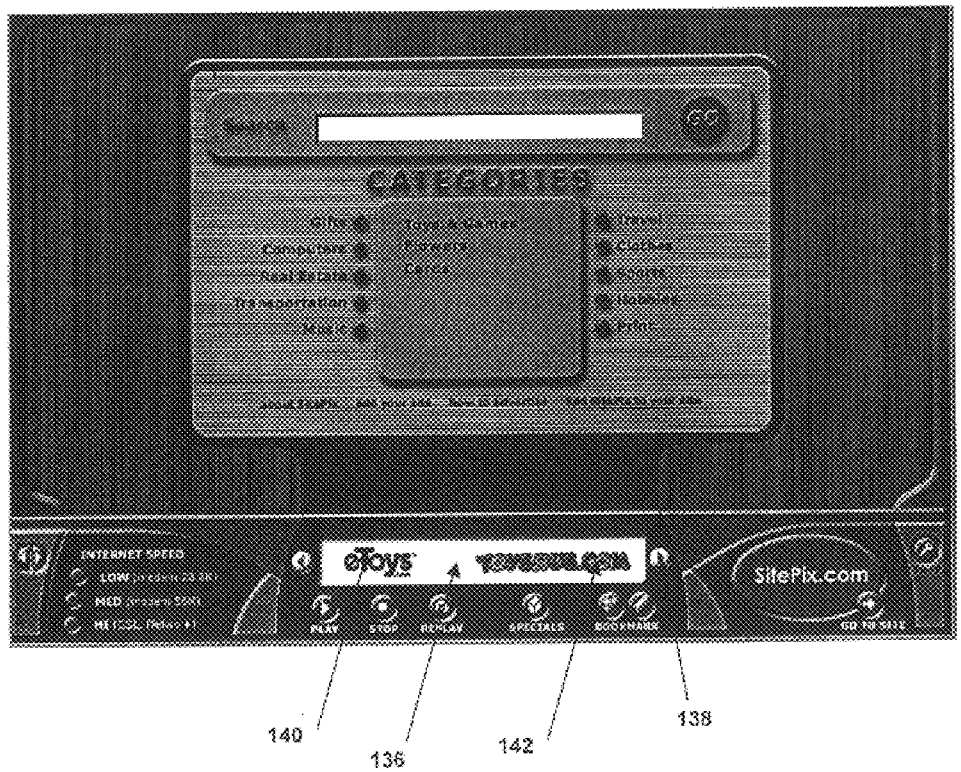
Figure 9D:
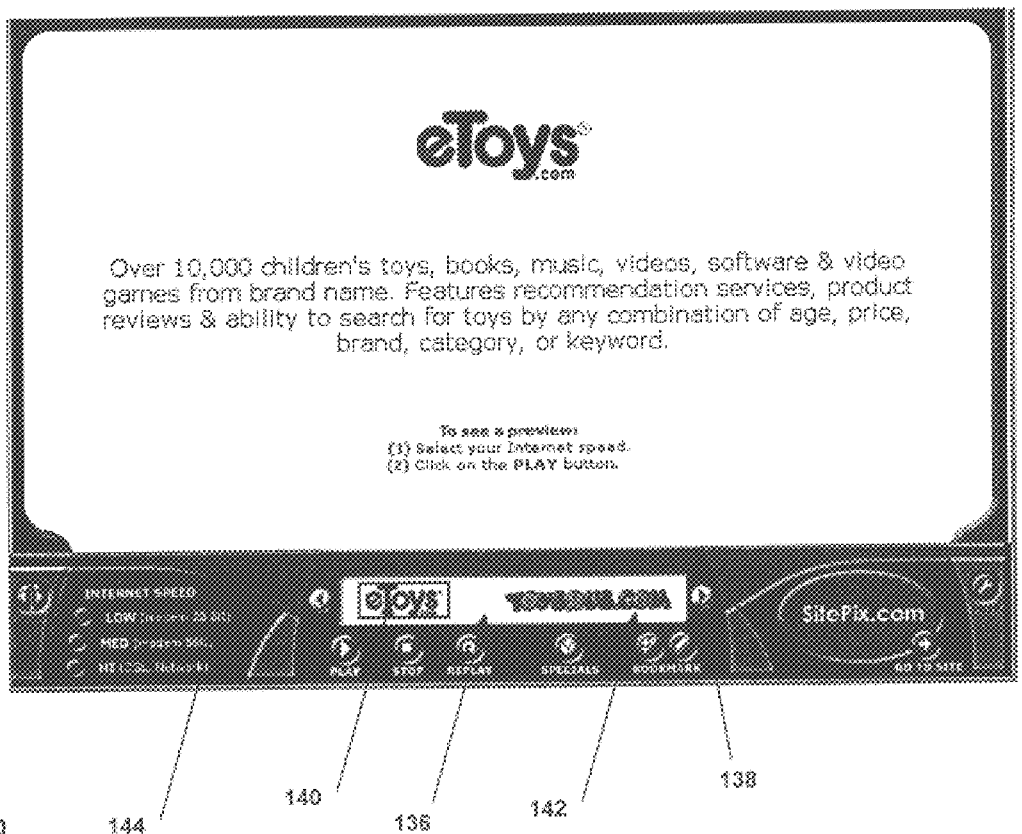
Figure 9E:
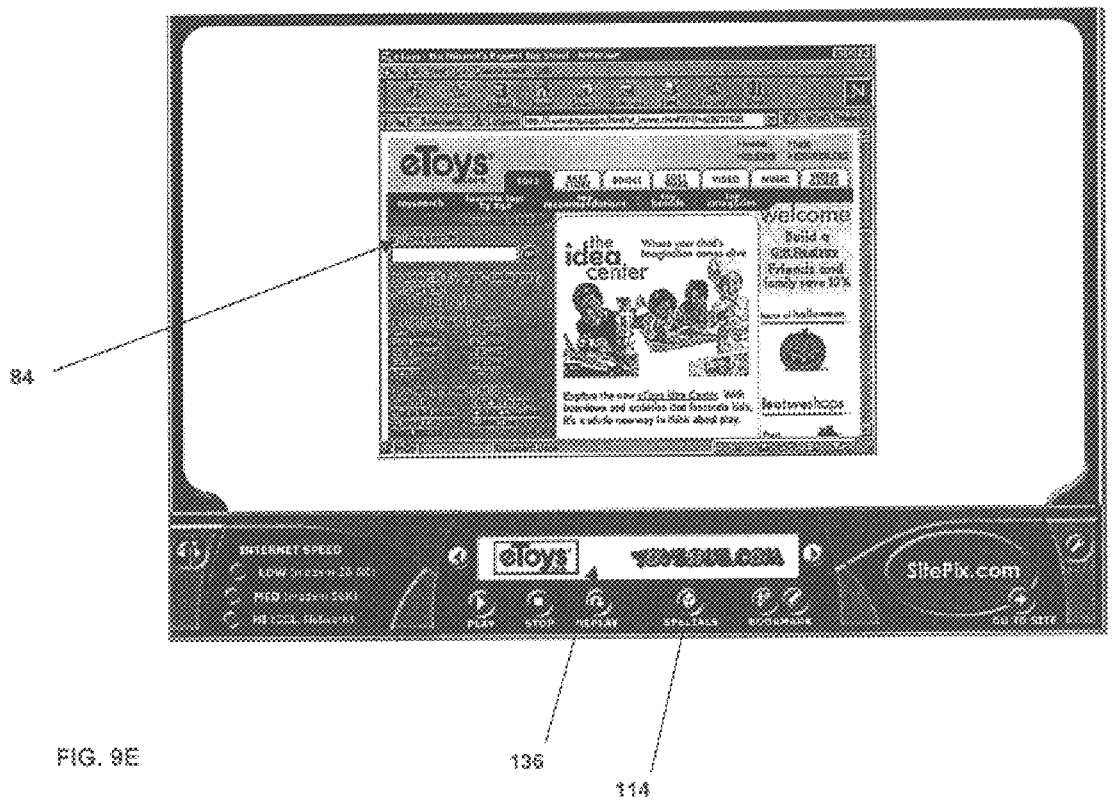
Figure 10A:
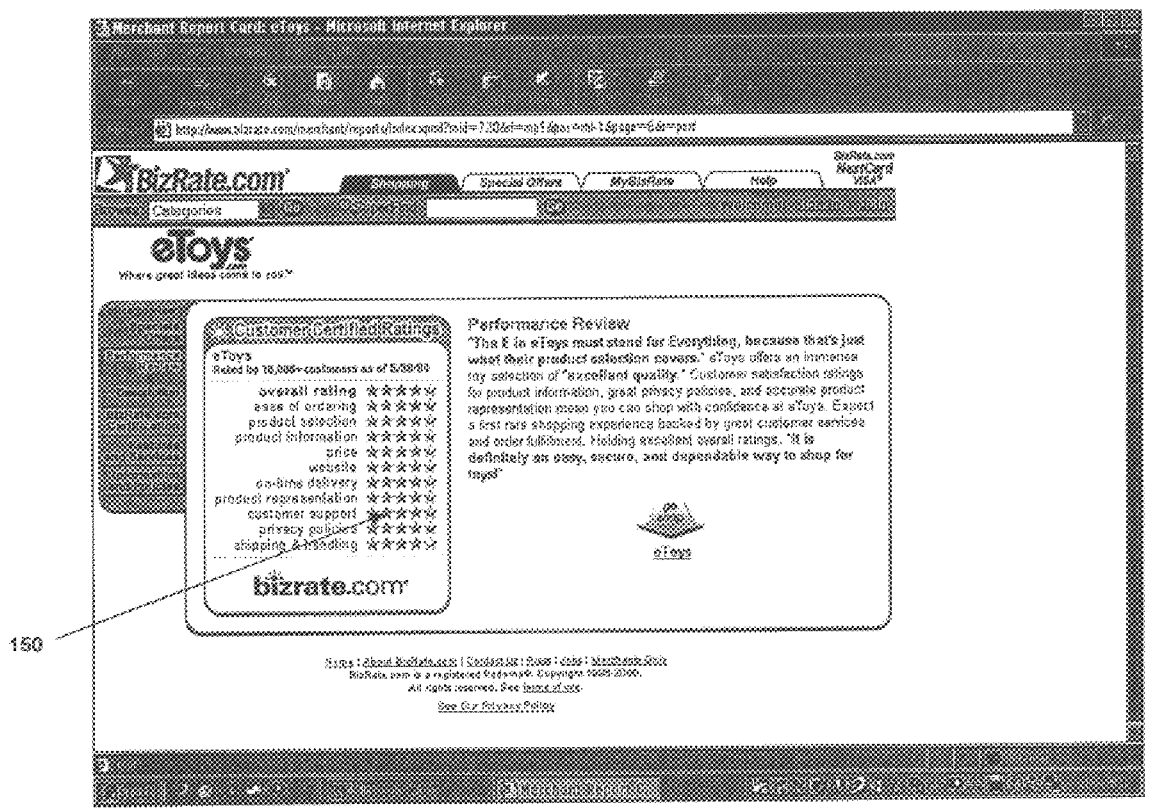
Figure 10B:
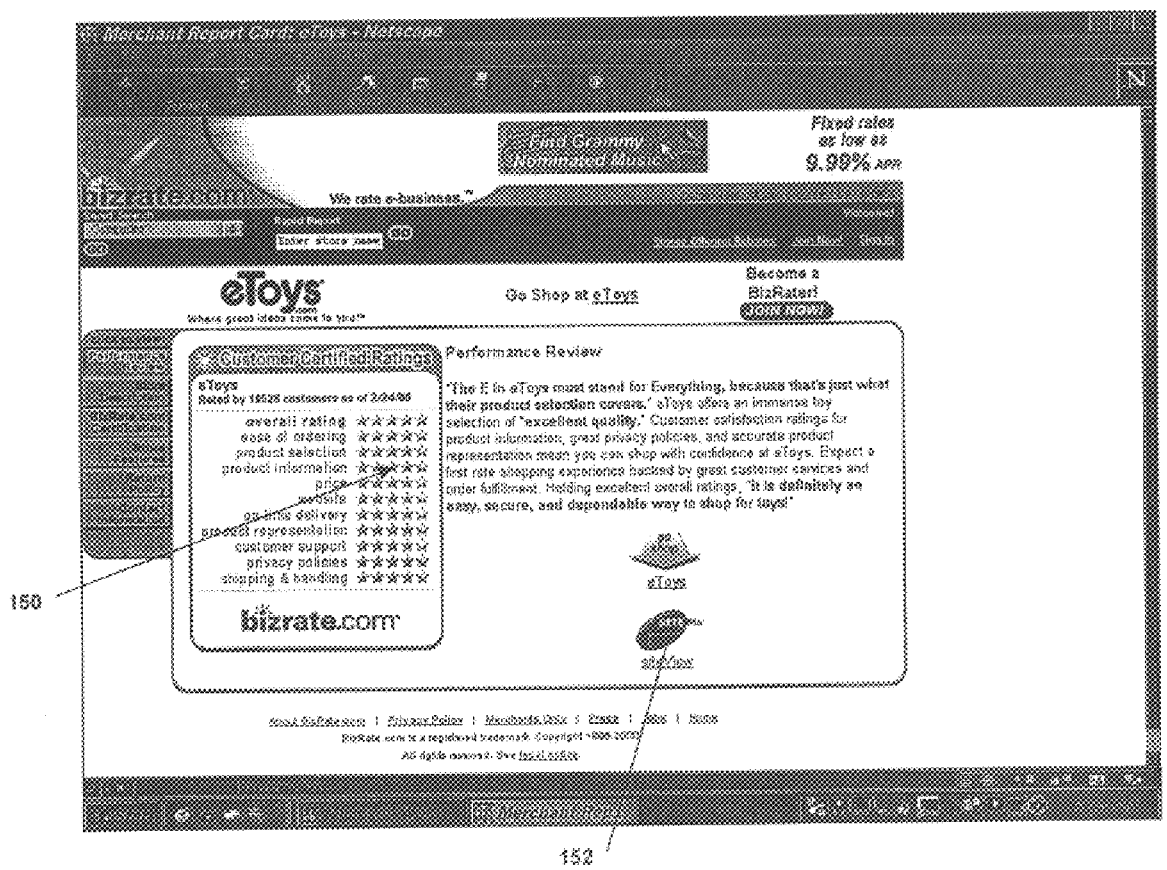
Figure 10C:
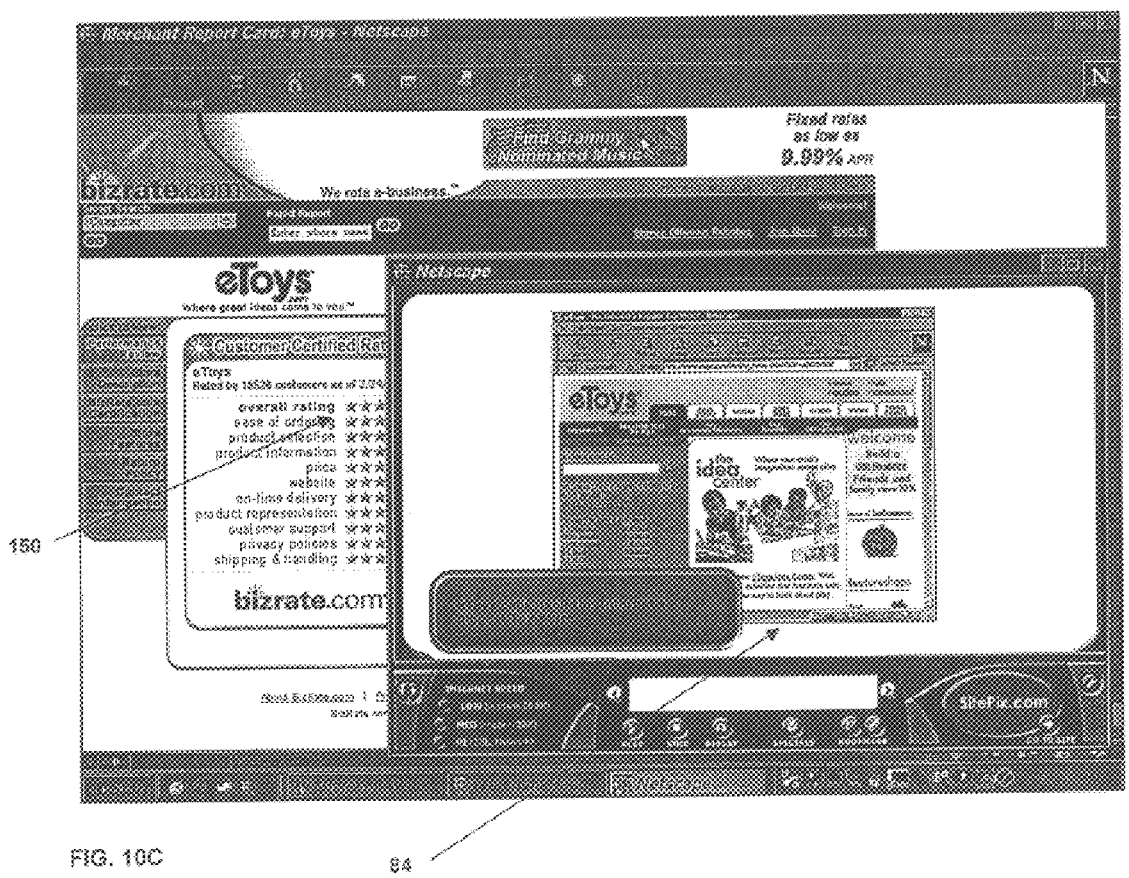

5A–5E are screen shots from another exemplary site feature—an interactive visual shopping cart—stored within the database and system of FIG. 1;

FIGS. 6A–6B are screen shots of an exemplary site feature deployed directly on an advertiser's website through the system of FIG. 1;

FIGS. 7A–7D are screen shots of exemplary site features deployed on a third party websites through a banner advertising network using the system of FIG. 1;

FIGS. 8A–8D are screen shots of an exemplary viewer through which the site previews features of the system of FIG. 1 are launched;

FIGS. 9A–9E are screen shots of an exemplary application—visual search directory—for the site previews and features stored within the database and system of FIG. 1; and FIGS. 10A–10C are screen shots of another exemplary application—website review—for the site previews and features stored within the database and system of FIG. 1.

DETAILED DESCRIPTION OF THE INVENTION

The present invention provides an improved method and system for visually and functionally extending the reach of web sites through the use of interactive, multimedia previews and features deployed in a variety of online applications. Referring now to FIG. 1, a presently preferred embodiment of the system 10 is illustrated. The system includes a database 11 of interactive, multimedia previews 12 and features 14. The database is operatively stored within, or coupled to, a server 16 or plurality of servers. Through a variety of online applications which access the database through the server, consumers and potential consumers can experience the previews and features throughout the Web. Some of the exemplary applications which access the database of previews and features in a presently preferred embodiment of the system include visual search directories 18, online customer care applications 20, banner advertisement networks 22, preview marketing networks 24, website reviews 26 and electronic mail networks. Users of the system can access the various applications through the Internet via any network device, including a personal computer (desktop 28 or notebook 30), personal digital assistant 32, advanced cable/satellite receiver or set-top box 34, or other Internet ready network or information appliance. Depending on network device selected, the user can access these applications through traditional Internet Service Providers using a dial-up connection, broadband providers using a direct subscriber line (DSL), cable companies using a cable modem and network, wireless or satellite providers using advanced wireless services, or other advanced communication or telecommunication providers using one or more of the above.

Each of exemplary applications illustrated in FIG. 1 will be described in more detail below, however, a more detailed description about the previews and features stored within the database will first be provided.

Site Previews

A site preview is a self-playing, animated educational or instructional overview of a web site that provides users with basic information about the site's focus, arrangement, content and/or features. By watching a site preview, a consumer or potential consumer is provided with an initial overview of a web site, without having to actually go directly to the site and attempt to navigate through the entire site. Additionally, by watching and comparing site previews of various web sites in the same market categories (e.g., ETOYS and TOYSRUS in the toys category), a consumer or potential consumer can quickly and easily gain an appreciation for the differences between the sites, and thus be in a better position to decide which site or sites to visit.

Site previews are preferably designed to provide consumers and potential consumers with the most relevant, basic information about a site, in an interesting, entertaining manner. For example, there are a number of standard features that are typically present in most popular web sites, particularly consumer e-commerce web sites. Most of the popular consumer e-commerce web sites (1) are divided into one or more categories based on the products or services offered through the site, (2) provide users with the ability to search products or services offered through the site, either by keywords or through the use of preset filters, (3) provide users with detailed information about the products or services offered through the site, and (4) allow users to purchase products or services through the site.

Figure 2A:
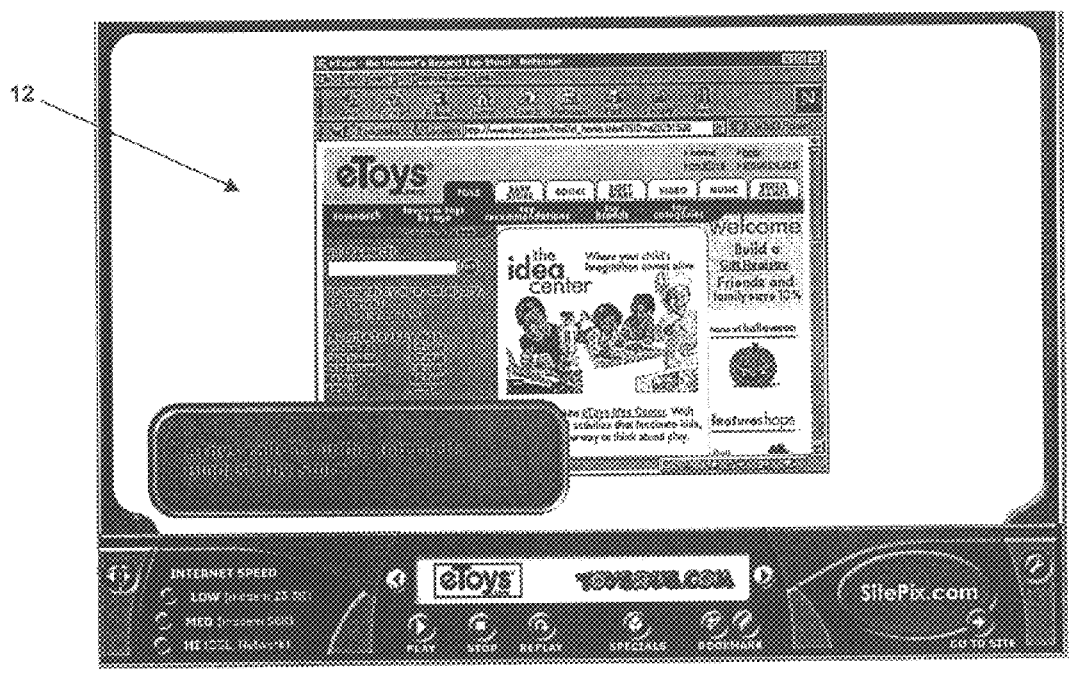
FIGS. 2A–2T are screen shots from an exemplary site preview stored within the database and system of FIG. 1.
Figure 2B:
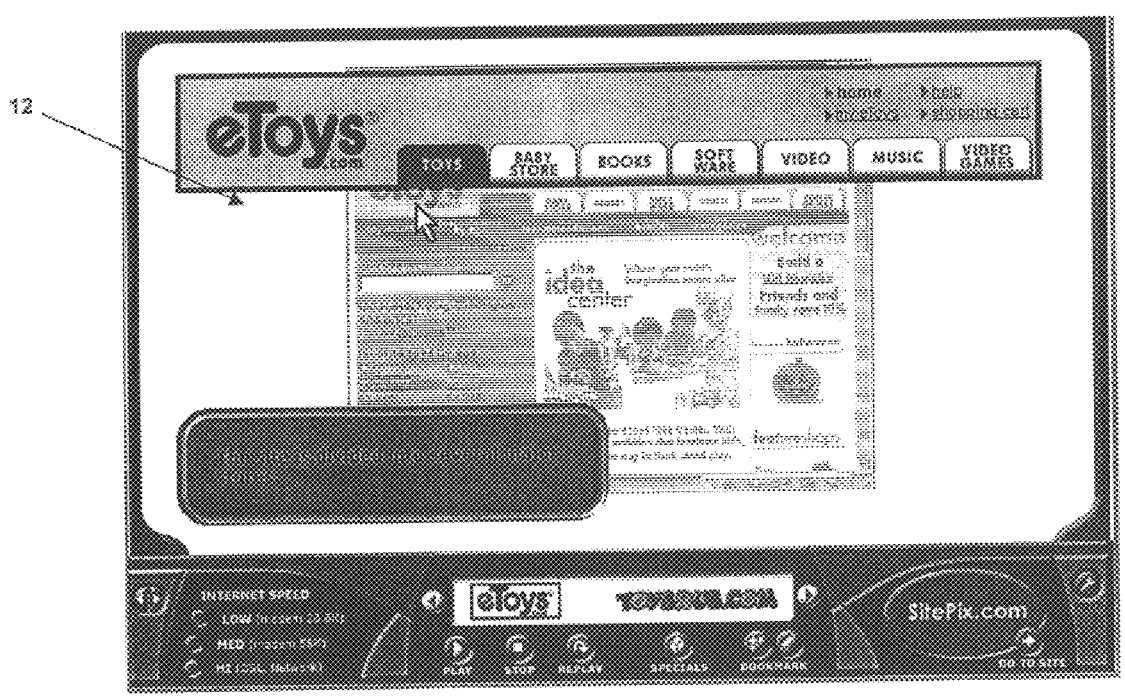
Figure 2C:
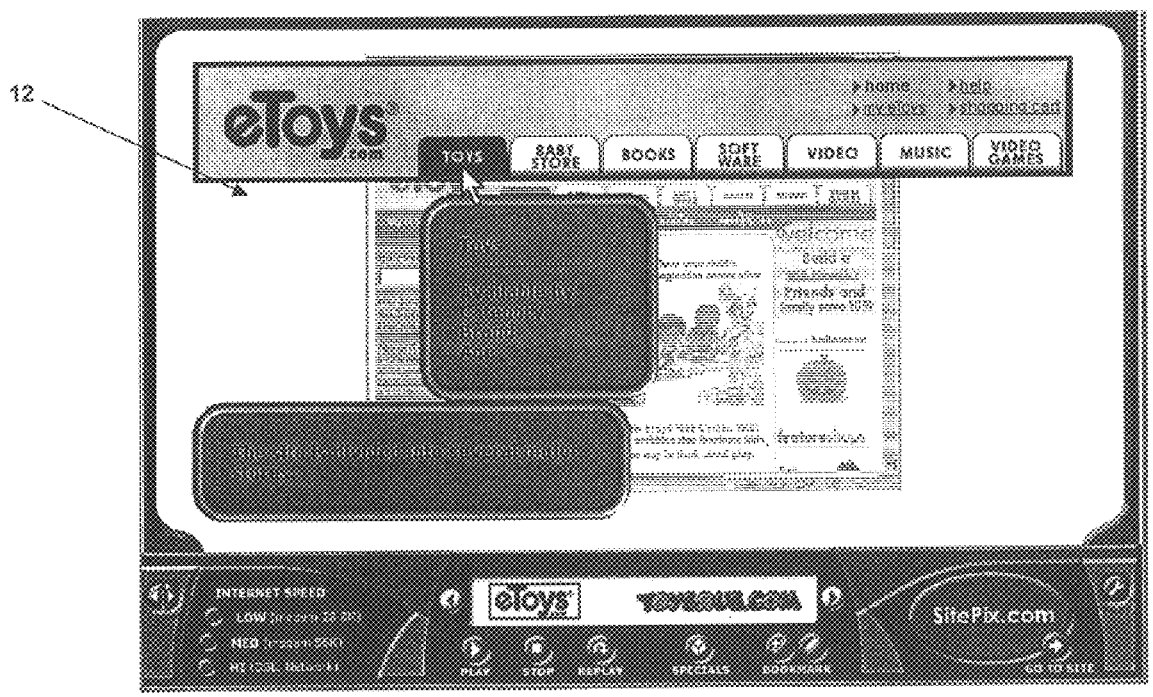
Figure 2D:
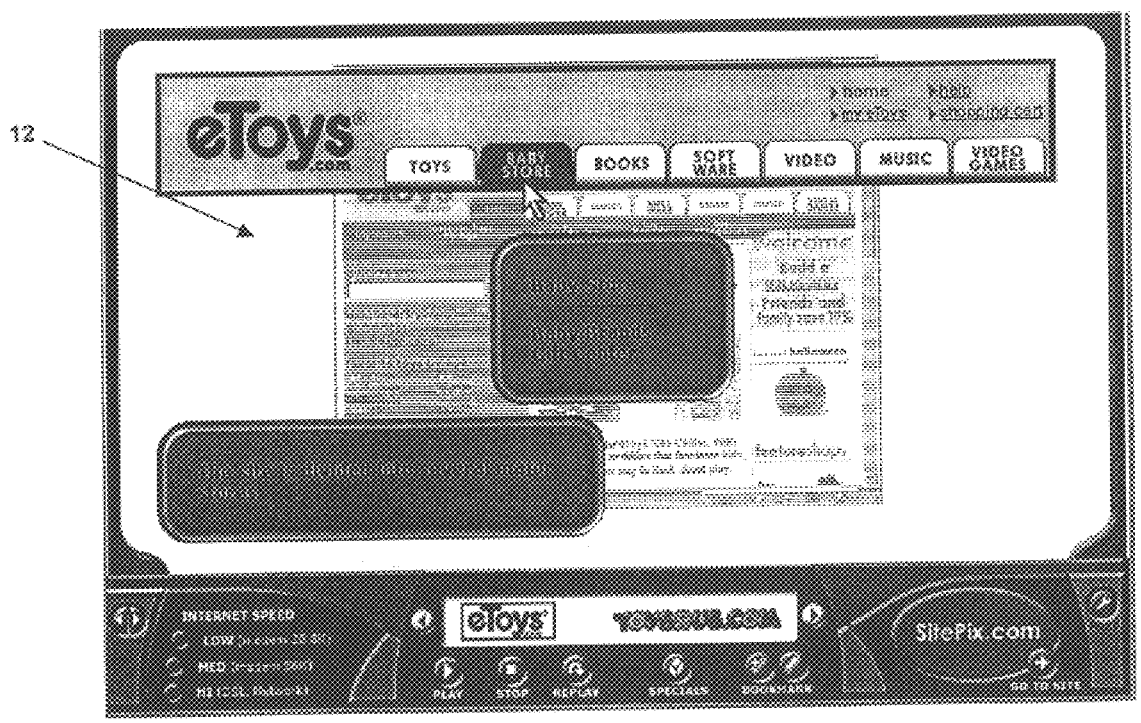
Figure 2E:
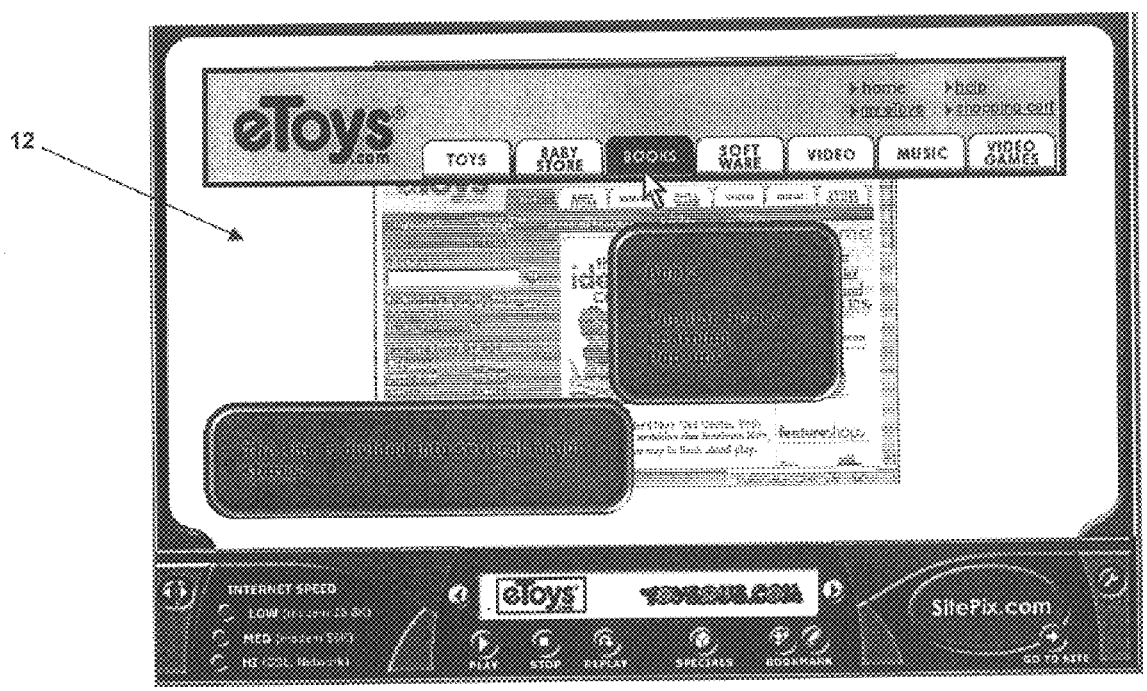
Figure 2F:
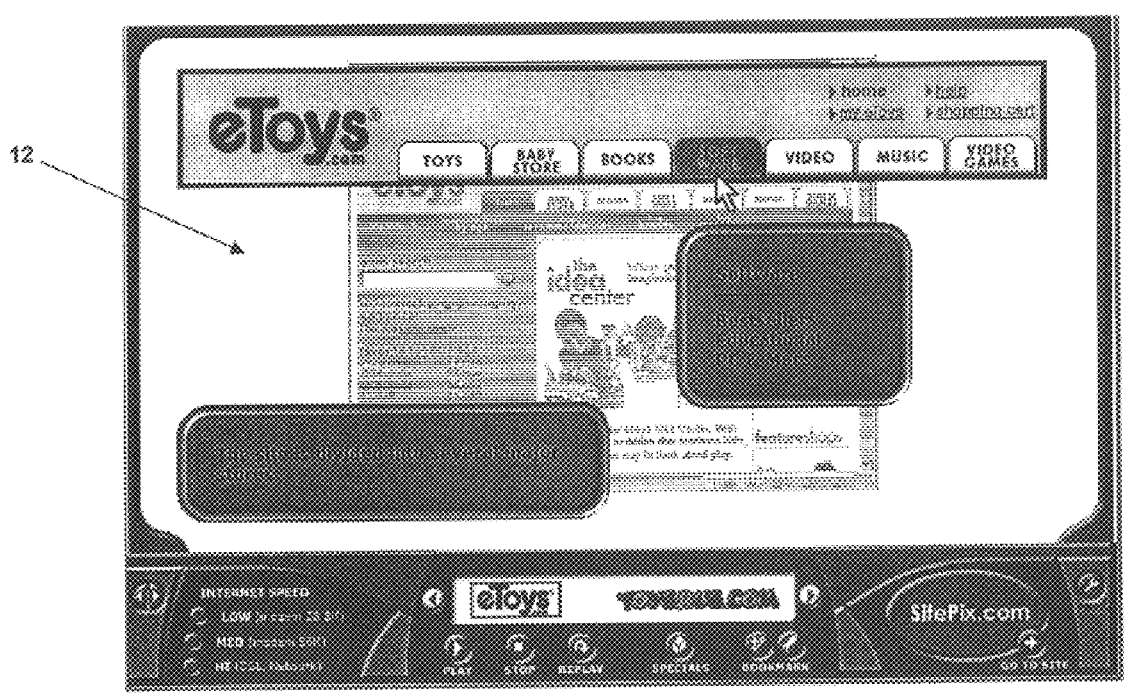
Figure 2G:
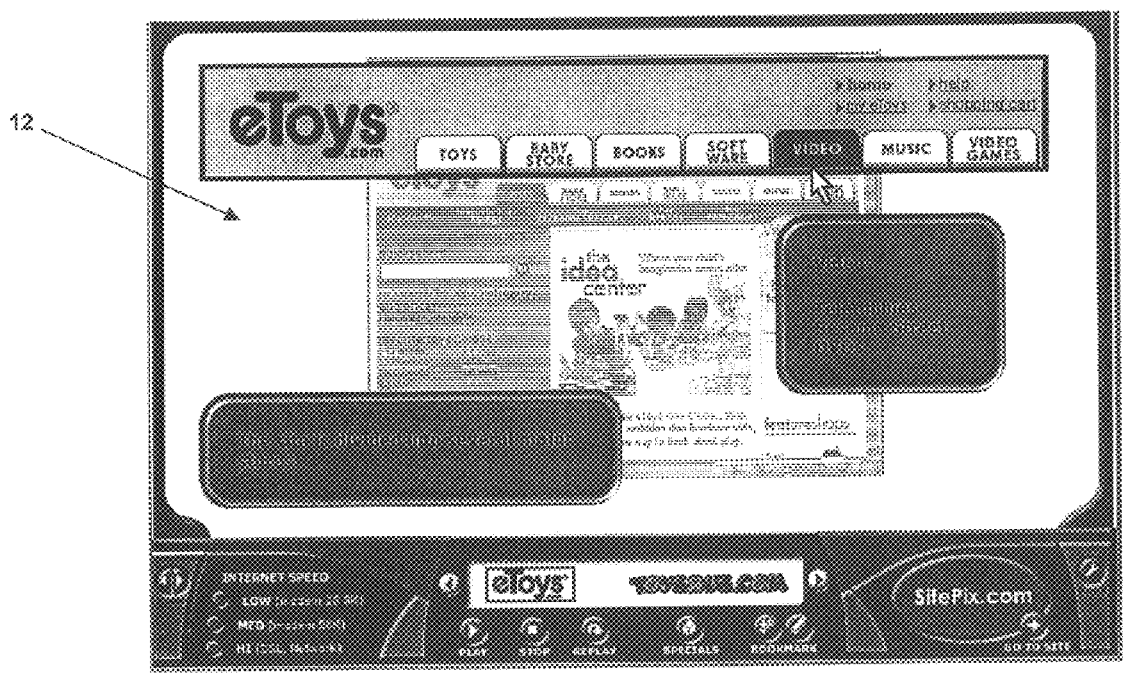
Figure 2H:
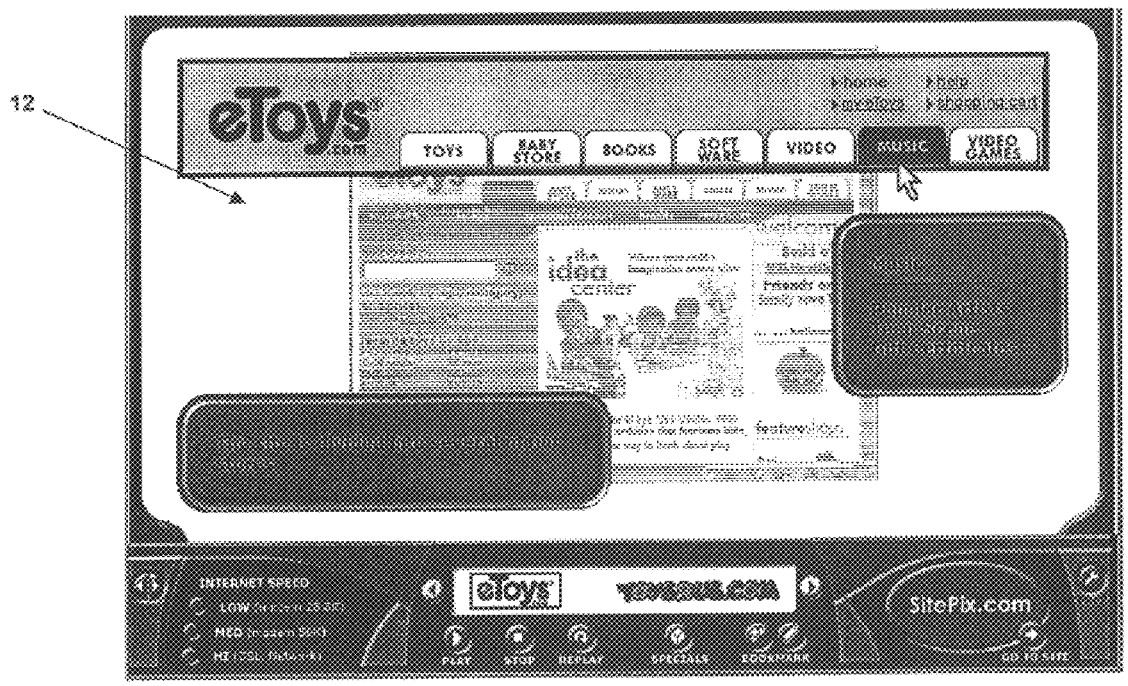
Figure 21:
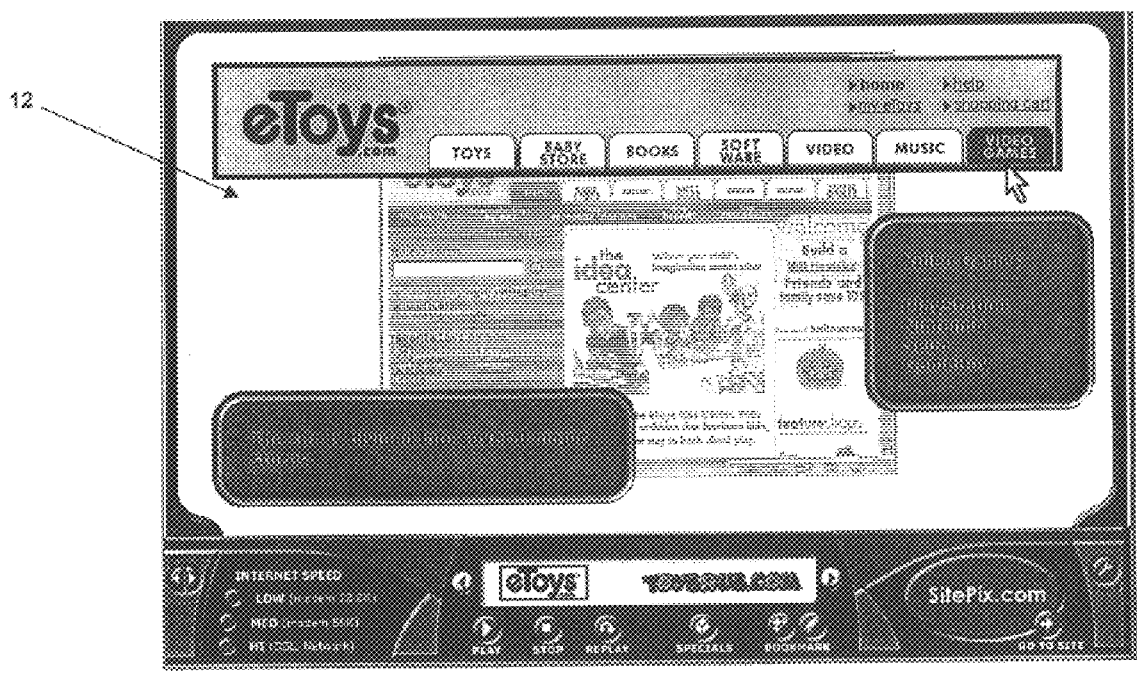
Figure 2J:
Figure 2K:
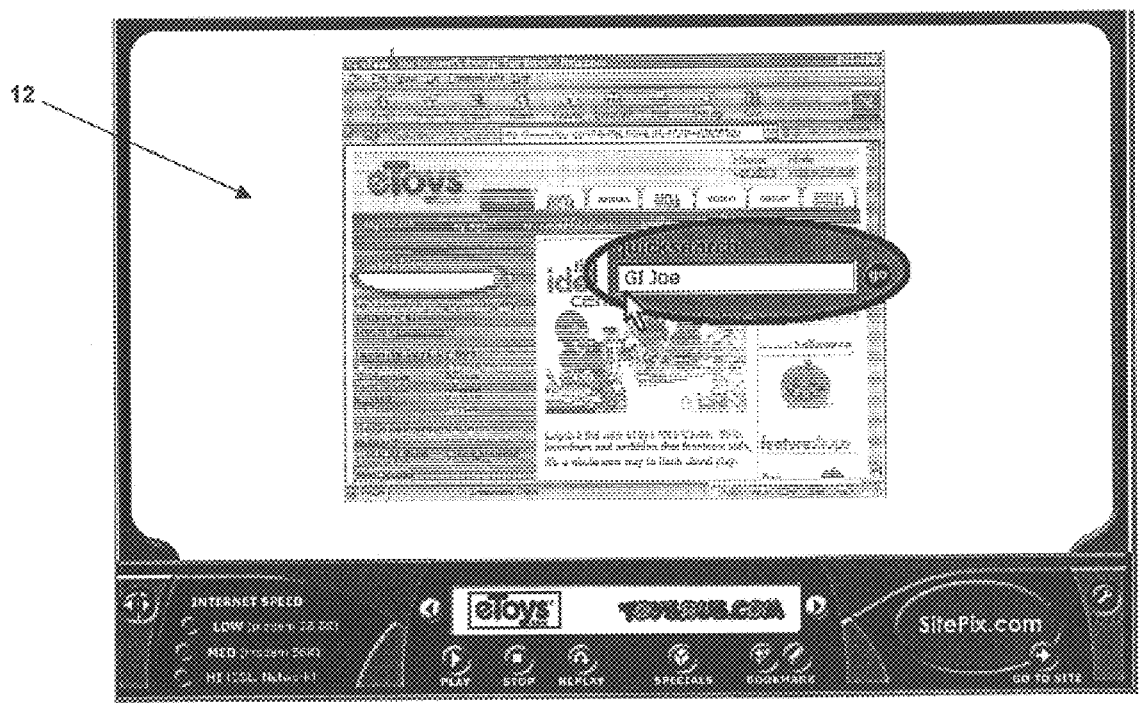
Figure 2L:
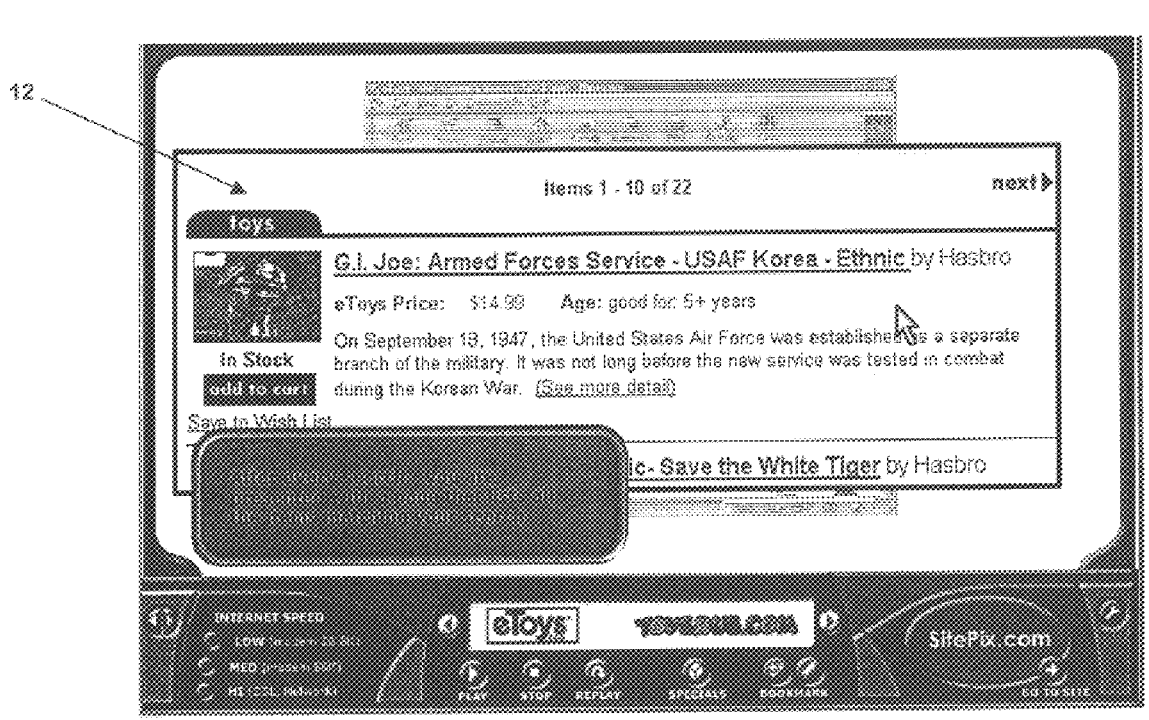
Figure 2M:
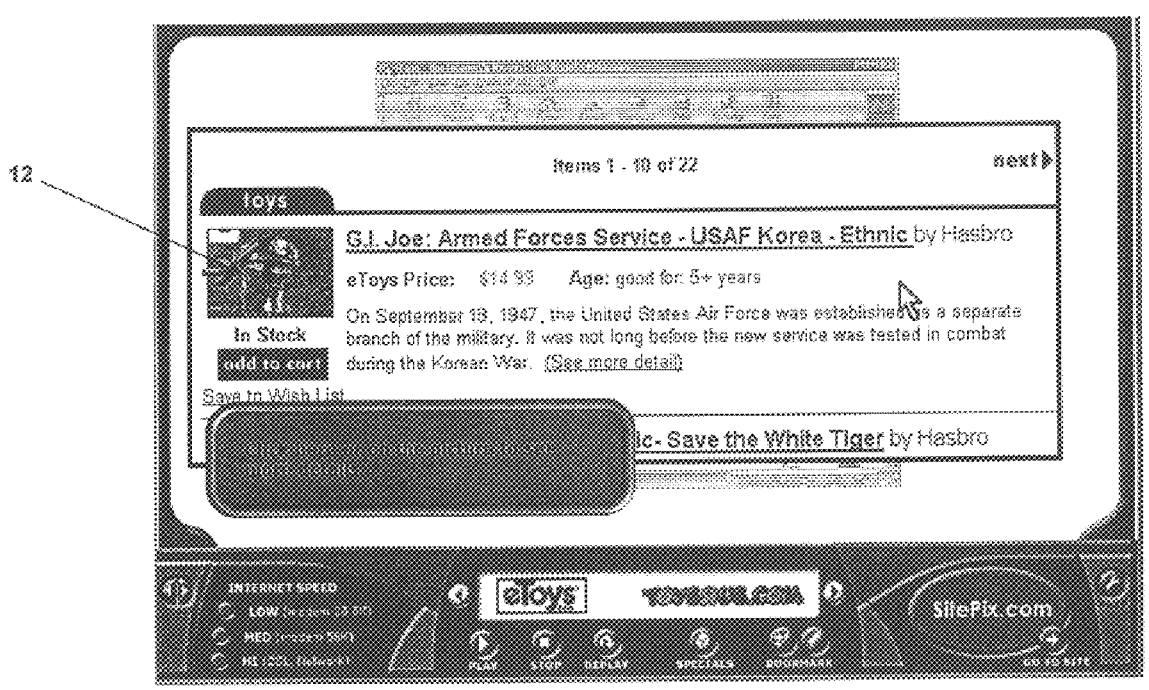
Figure 2N:
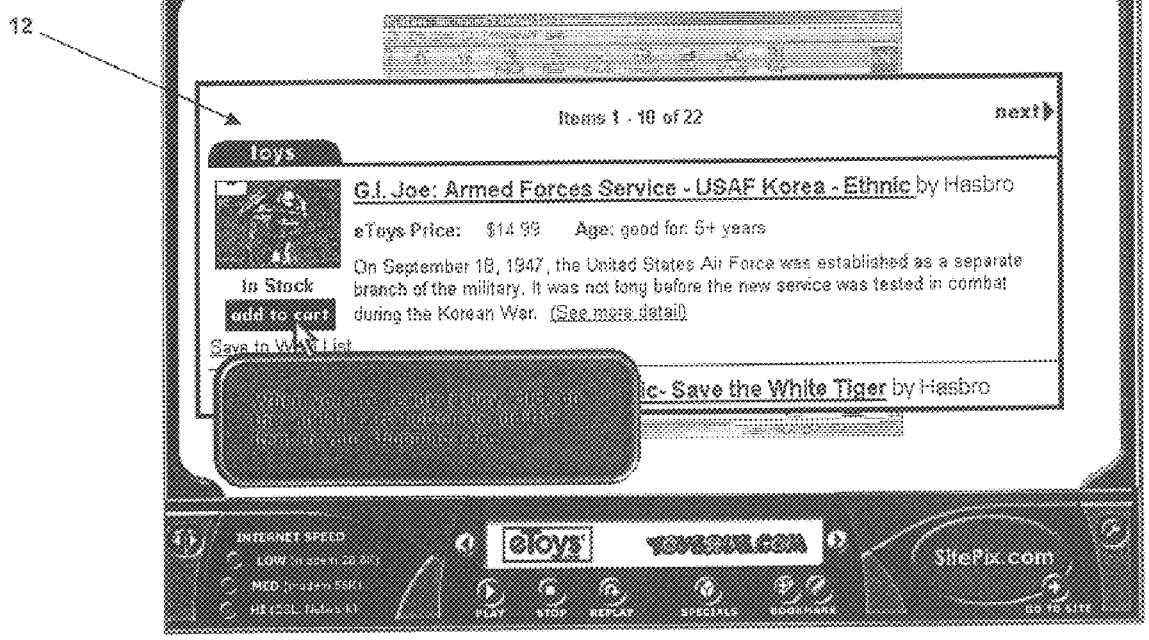
Figure 20:
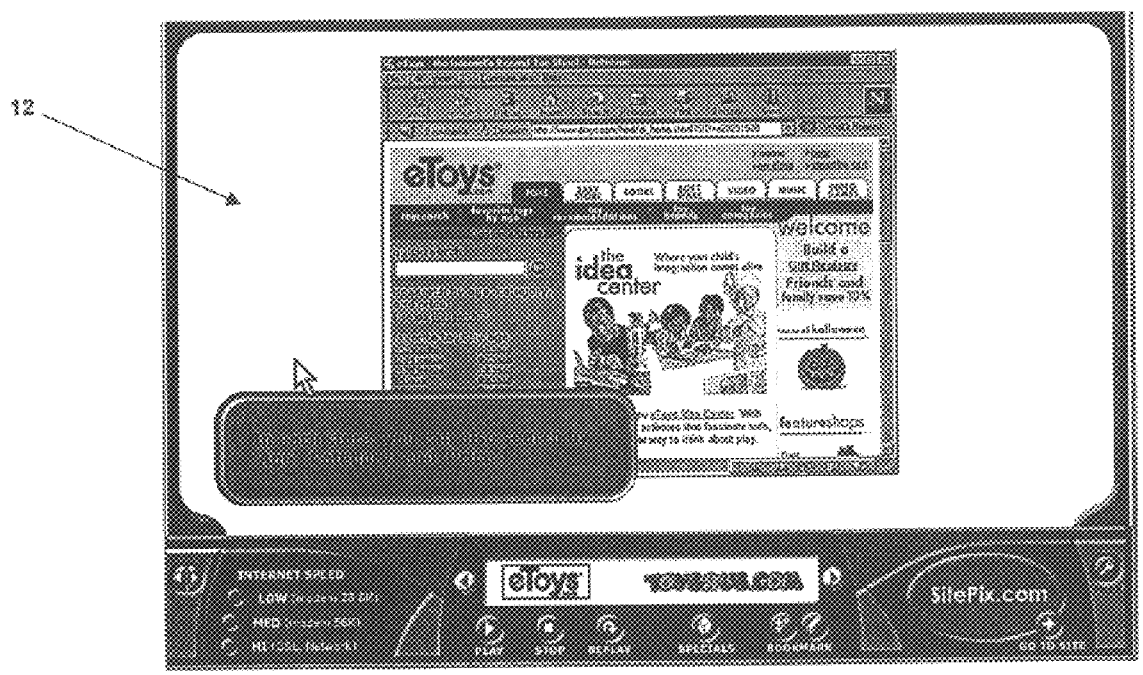
Figure 2P:
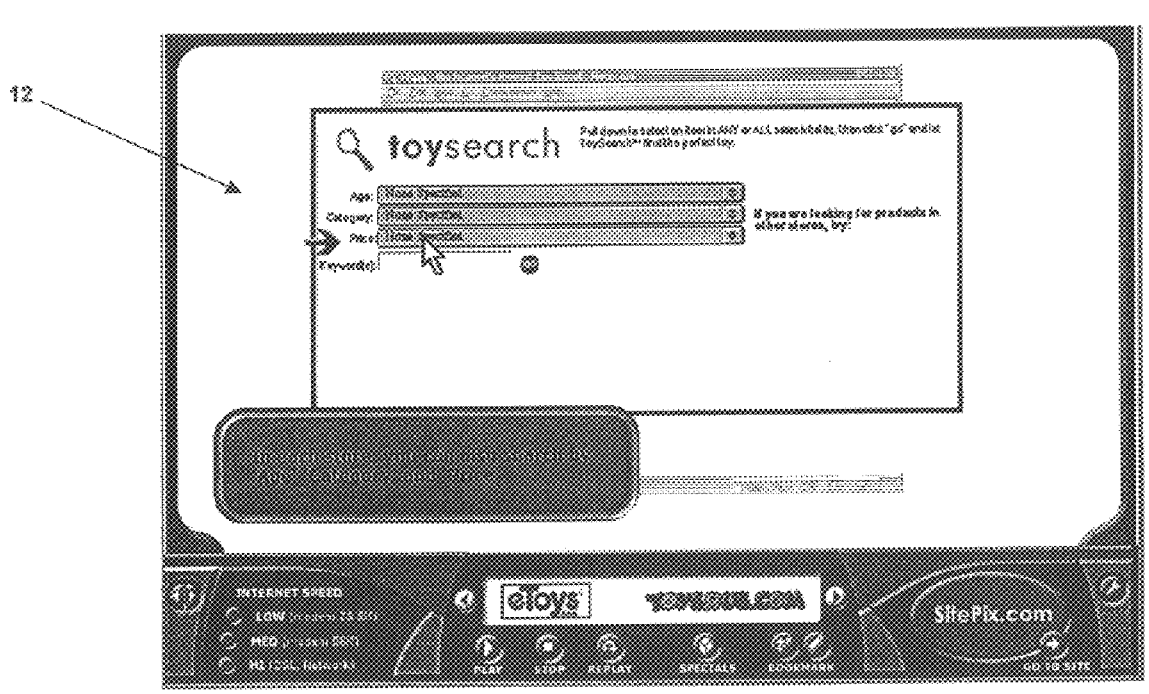
Figure 2Q:
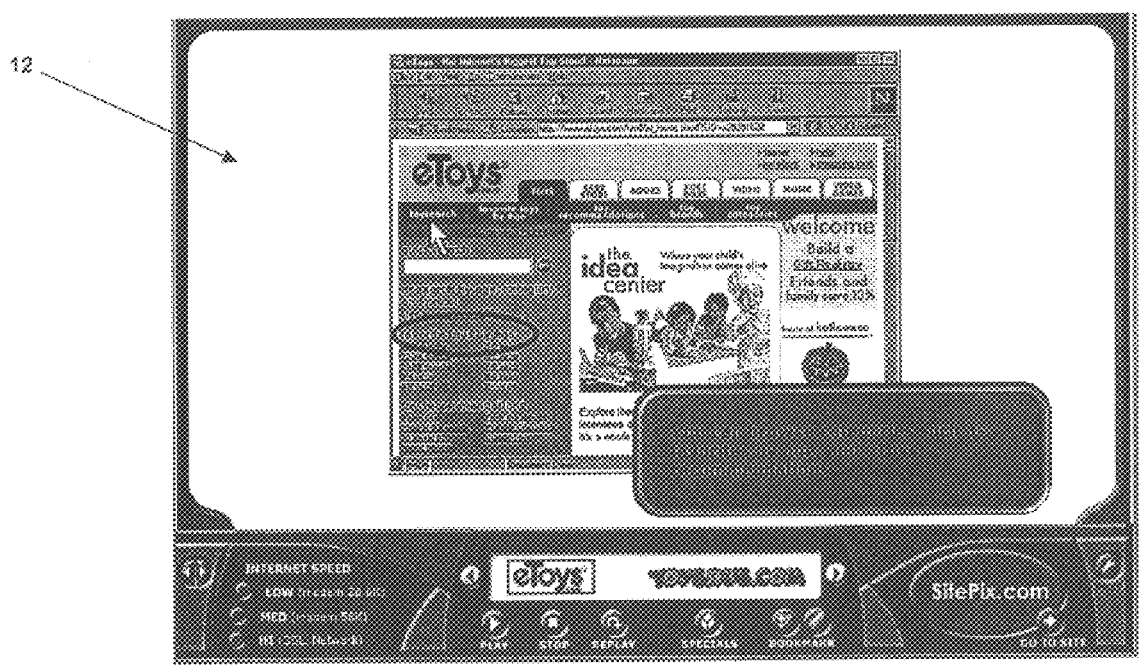
Figure 2R:
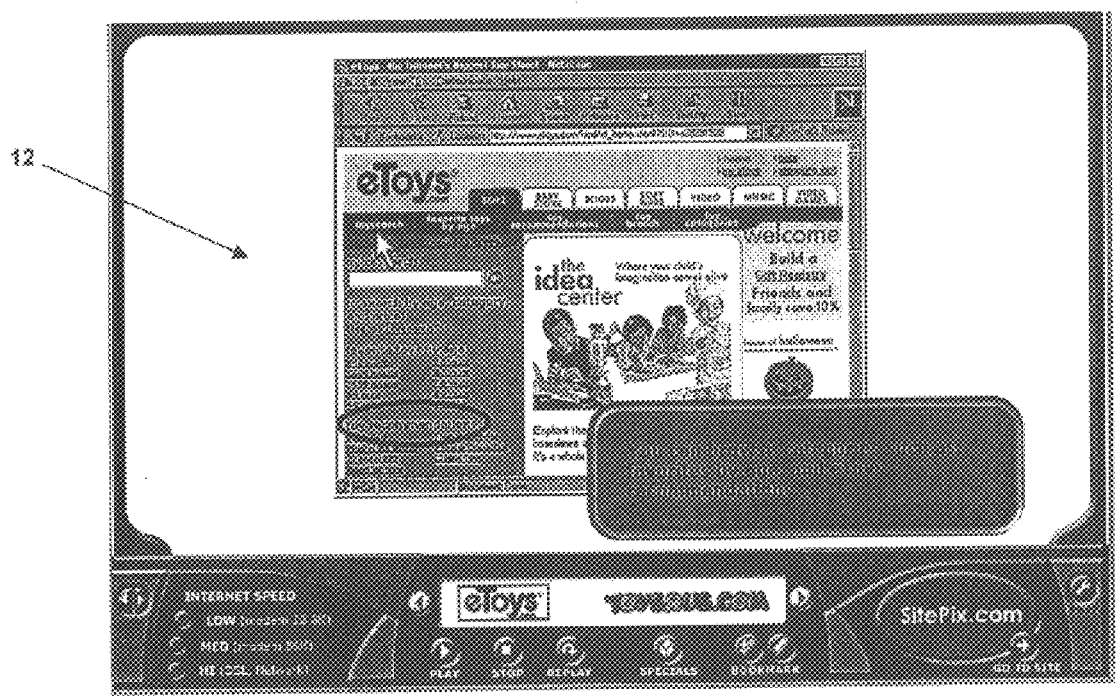
Figure 2S:
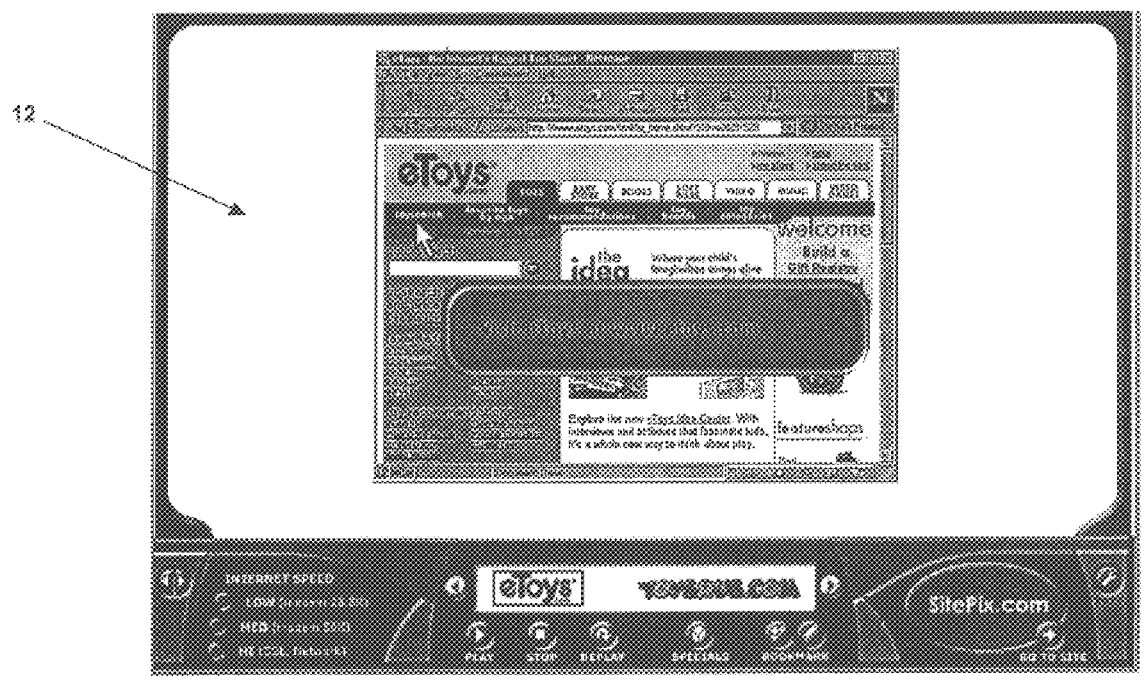
Figure 2T:
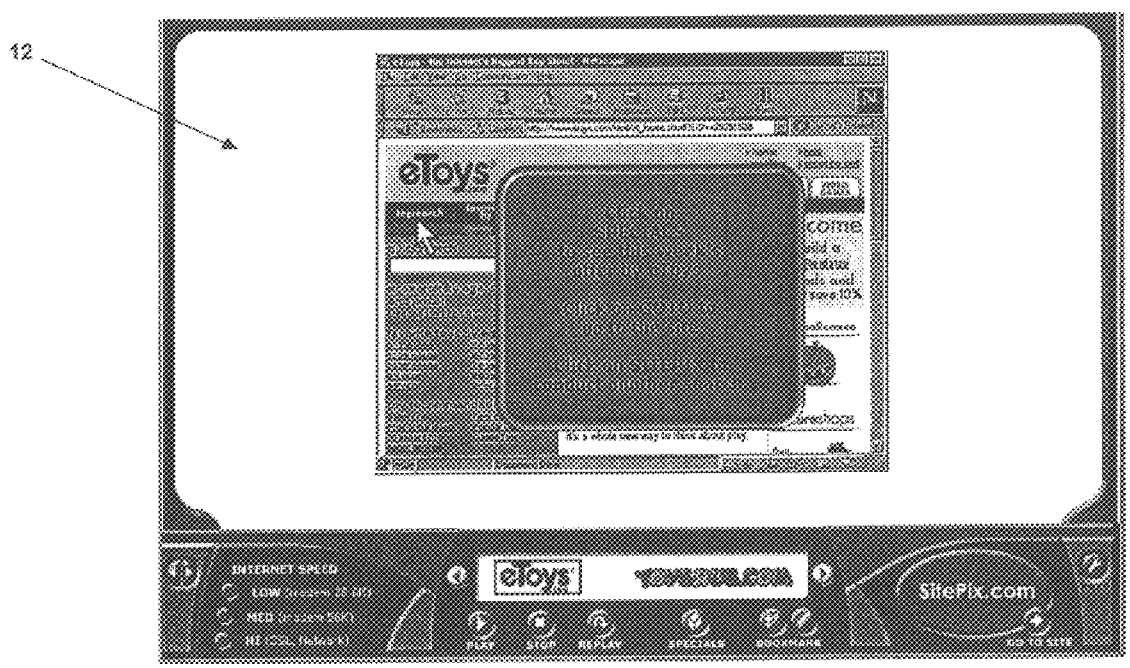

Referring now to FIGS. 2A–2T, an exemplary site preview of ETOYS is illustrated through the use of select screen shots from the animated preview. In FIG. 2A, the site preview opens by observing that ETOYS focused on the toy market, claiming to be the Internet's biggest toy store. The site preview then observes that the site is divided into several major categories (FIG. 2B), highlighting toys (FIG. 2C), baby store (FIG. 2D), books (FIG. 2E), software (FIG. 2F), video (FIG. 2G), music (FIG. 2H) and video games (FIG. 2I). Next, the site preview illustrates how to use a quick search feature to directly locate products available through the site (FIG. 2J). For example, the site preview includes a exemplary search using the keywords GI JOE (FIG. 2K). The search returns twenty-two items, each of which includes a picture of product, price and brief production description (FIG. 2L). The site preview then goes on to show users how to get additional information about the product (FIG. 2M) or add the product to their shopping carts when they are ready to make purchase (FIG. 2N). Next, the site preview goes on to highlight some of the unique features of the ETOYS site, such as the ability to search by age, category or price (FIG. 2O–P), look at favorite toys for different age groups (FIG. 2Q), and view recommendations made by ETOYS and others (FIG. 2R). At the end of the site preview, users are preferably provided with a hyperlink to the ETOYS site (FIG. 2S&T) so that they can go directly to the site if they are so inclined.

The ETOYS site preview described above is merely illustrative of the type of information that can be provided to consumers and potential consumers through a site preview. Those skilled in the art should realize that other types of information about a site may additionally or alternatively be provided through the site preview, so that each site preview is custom designed to provide the most relevant information. For example, if a company discovers that consumers and potential consumers often have the same questions about shipping or return procedures, the site preview can be designed or modified to provide the relevant information about the shipping and return procedures of the company. The site previews are particularly well suited to provide this and other types of typical customer care information that is presently handled by live support, e-mail responses, and frequently asked question lists.

The site preview described and illustrated above was a no audio or text-only site preview. In other words, the preview did not use any audio or sound to convey information, but rather conveyed the information through text and phrases that appeared in pop-up boxes throughout the preview. No audio site previews are particularly well suited for lower bandwidth (e.g. 14.4 and 28.8 Kps) environments. In contrast to the text-only site previews, it is possible to design and create an audio site preview, wherein all of the information within the preview is conveyed through an audio or sound file incorporated into the preview. Audio site previews are generally best suited for higher bandwidth (e.g., DSL and cable modem) environments. Additionally, it is possible to create selective audio or primarily text-only site previews, wherein only small select amounts of audio or sound are incorporated into the site preview (e.g., "Welcome to ETOYS.com"), but the majority of the information is still conveyed through text and phrases that appear in pop-up windows throughout the preview. Primarily text-only site previews are generally best suited for middle bandwidth (e.g., 56 Kps) environments, where the audio components provide an additional level of interactivity to the site preview, but are not so large as to interfere with the ability of consumers and potential consumers to watch the preview with little to no interruptions.

Site previews are preferably designed and created using one or more rich media formats. In a presently preferred embodiment, the site previews are created using dynamic hypertext mark-up language (DHTML) code and a Java based animation engine. Those skilled in the art, however, should realize that other rich media formats, such as vector graphics (e.g., FLASH), SHOCKWAVE or video can additionally or alternatively be used to create the site previews. Each of the various rich media formats has certain advantages and disadvantages relative to the other formats. For example, by creating the site previews in DHTML, no download or plug-in is required to watch the preview on all 4.0 and up Web browsers. Additionally, the resulting site previews are relatively small in size—a standard no audio site preview is approximately 80 K, a standard audio site preview is approximately 350 K, and a standard selective audio site preview is approximately 150 K. As a result, consumers and potential consumers can still have an enjoyable experience watching the site previews on dial-up connections. One of the potential disadvantages of using DHTML to create the site previews is that there is no commonly excepted format for DHTML—in other words, there are variations between different browsers, different versions of browser, and different platforms. In a presently preferred embodiment, an authoring tool is used to create site previews which automatically generates the necessary DHTML code to compensate for the variations identified above. The authoring tools allows a site preview designer to specify the specific action or animation desired, and then automatically generates the necessary DHTML code for that action or animation in each and every existing version of DHTML. The resulting site preview creating using this authoring tool will run on any platform because it contains the necessary DHTML code for each action within the preview for every existing DHTML version.

Site Features

In addition to the standard site previews described and illustrated above, the system database also includes site features. While site previews are designed to provide consumers and potential consumers with a general overview or introduction to the most relevant, basic information about a site, site features are primarily designed to focus more on more detailed attributes of a site, a product or a service offering. Additionally, while site features are generally aesthetically similar to site previews, in that they are interactive, multimedia presentations, site features also include certain integrated functional enhancements that are not necessarily present within site previews. However, since the same functionality can be selectively integrated into site previews, the terms "preview" and "feature" will be used interchangeably throughout this application.

Some of the basic functionality that can be selectively integrated into site previews or features includes transactional capabilities and data tracking/consumer profiling capabilities. For example, a site preview or feature can be designed to allow for secure electronic commerce transactions to be conducted directly within the site preview or feature. Using this enhanced functionality, advertisers can use site previews or features to promote or advertise certain product or service offerings, and provide consumers and potential consumers the option of purchasing those products or services directly through the site feature. Additionally, a site preview or feature can be designed to allow for advanced data capture and data profiling to occur within the site preview or feature. Using this enhanced functionality, advertisers can use site previews or features to capture consumer data, both by prompting consumers and potential consumers to directly input data and by passively tracking and collecting data related to consumer and potential consumer interaction with the site preview or feature. The data tracking and consumer profiling capabilities integrated into site previews and features is particularly powerful because, as described in more detail below, the same site previews and features can be syndicated for deployment in a variety of different online applications. As a result, advertisers can gather and compare consumer data from the same site preview or feature in several different vertical markets, which can then be analyzed and used to provide extensive and comprehensive customer profiling and feedback.

Figure 3:
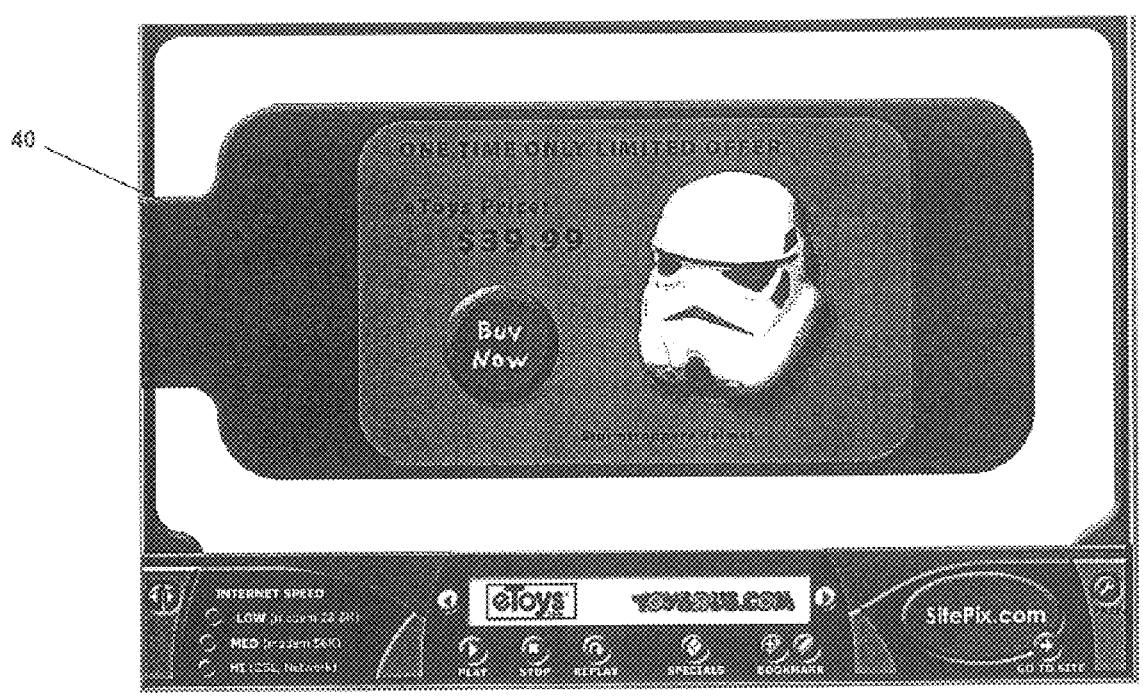
FIG. 3 is a screen shot from an exemplary site feature—an updateable transaction panel—stored within the database and system of FIG. 1.

Referring now to FIG. 3, one exemplary embodiment of a site feature is illustrated. The site feature illustrated in FIG.

3 includes a updateable transaction panel that allows advertisers to dynamically add new content to their site features at any time. Using this feature, advertisers can automatically update their site features to highlight special product or service offerings on a regular basis. For example, the site feature illustrated in FIG. 3 is designed to allow ETOYS to dynamically add new products that they want to highlight through the feature. This allows advertisers to use new content to continually reach repeat customers through their site features. In FIG. 3, the site feature is highlighting a STAR WARS storm trooper mask available from ETOYS. If a consumer is interested in the highlighted product or service, he can click the BUY button provided within the site feature to purchase it directly through the feature. At any time, ETOYS can dynamically add new content to, or replace the existing content within, the site feature. For example, ETOYS can use the site feature to highlight its toy recommendations, updating the content on a daily or weekly basis. In a presently preferred embodiment, advertisers are provided with the ability to automatically update, via an application service provider model over the Web, the content in their updateable transaction panel, within certain predefined limits, without the need to integrate with the system administrator. As a result, advertisers can access the system database directly to update their own site feature on a regular basis. Those skilled in the art should realize that the site feature illustrated and described above is only exemplary, and other functional enhancements can be additionally or alternatively integrated into the feature. For example, although only one product is highlighted in the site feature, it should be readily apparent that any number of different products or services can be highlighted, as well as separately updateable, as desired by the advertiser.

Figure 4A:
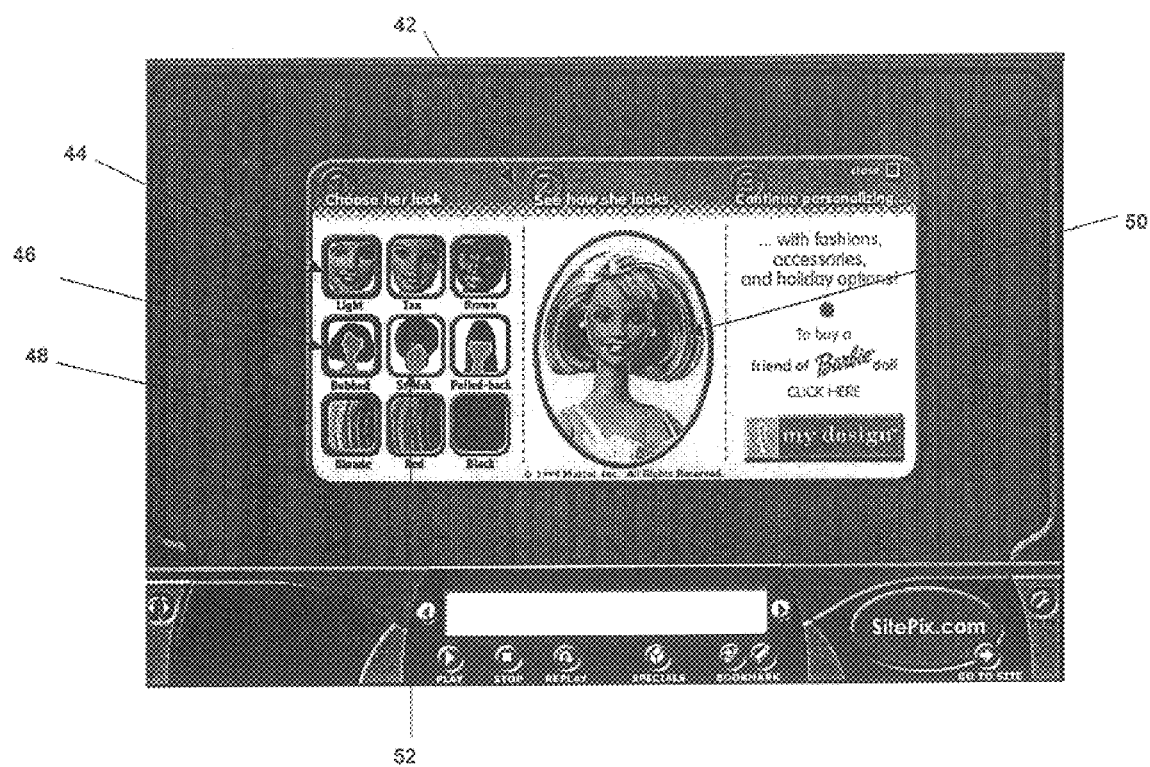
FIGS. 4A–4B are screen shots from another exemplary site feature—an interactive product customization module—stored within the database and system of FIG. 1.
Figure 4B:
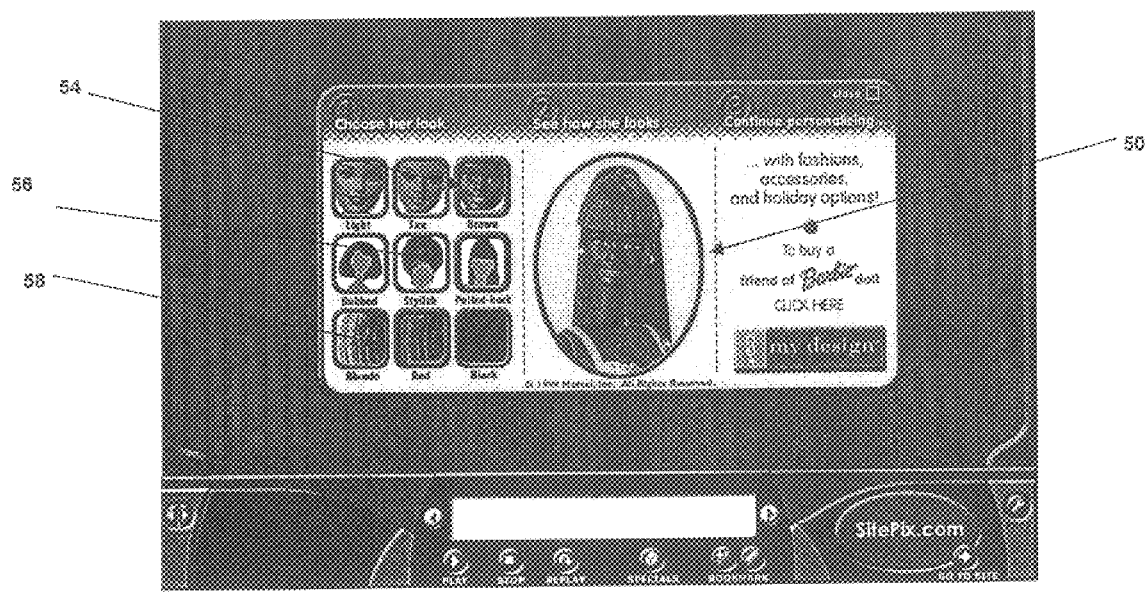

Referring now to FIG. 4A another exemplary embodiment of a site feature with additional functionality is illustrated. The site feature illustrated in FIG. 4A includes an interactive product customization module 42 that allows consumers and potential consumers to build-to-order products, and then purchase those customized products directly through the site feature. For example, the site feature illustrated in FIG. 4A is designed to allow consumers to build-to-order their own friend of BARBIE doll. Consumers are provided with three different options of skin color 44 (light, tan or brown), hair style 46 (bobbed, stylish or pulled back), and hair color 48 (blonde, red or black) from which to select to customize their doll. For example, in FIG. 4A, the consumer has selected the doll with the following characteristics: light skin, bobbed hair style and blonde hair. The resulting doll is pictured within a viewing window 50 in the site feature. If the consumer desires to change any of the customizable characteristics of the doll, she can simply click on the graphical representation of the respective characteristic that she wants to change. For example, if the consumer wants to change the hair style of his doll from bobbed to stylish, she can simply click on the stylish graphic 52. The site feature automatically updates this characteristic of the doll in real-time and displays the updated doll in the viewing window. The consumer can follow a similar process for changing any of the other customizable characteristics of the doll, as illustrated in FIG. 4B where the consumer has selected the following characteristics, as evidenced by the respective highlighted graphical representations: brown skin color 54, pulled back hairstyle 56 and red hair color 58). Once the consumer has finished customizing her doll, she can click the BUY button provided within the site feature to purchase her customized doll directly through the feature. Those skilled in the art should realize that the site feature illustrated and described above is only exemplary, and other functional enhancements can be additionally or alternatively integrated into the feature. For example, although only three choices of characteristics are provided under each of the categories in the site feature, it should be readily apparent that any number of different characteristics and any number of different categories can be provided, depending on the particular requirements of the product or service featured.

Figure 5A:
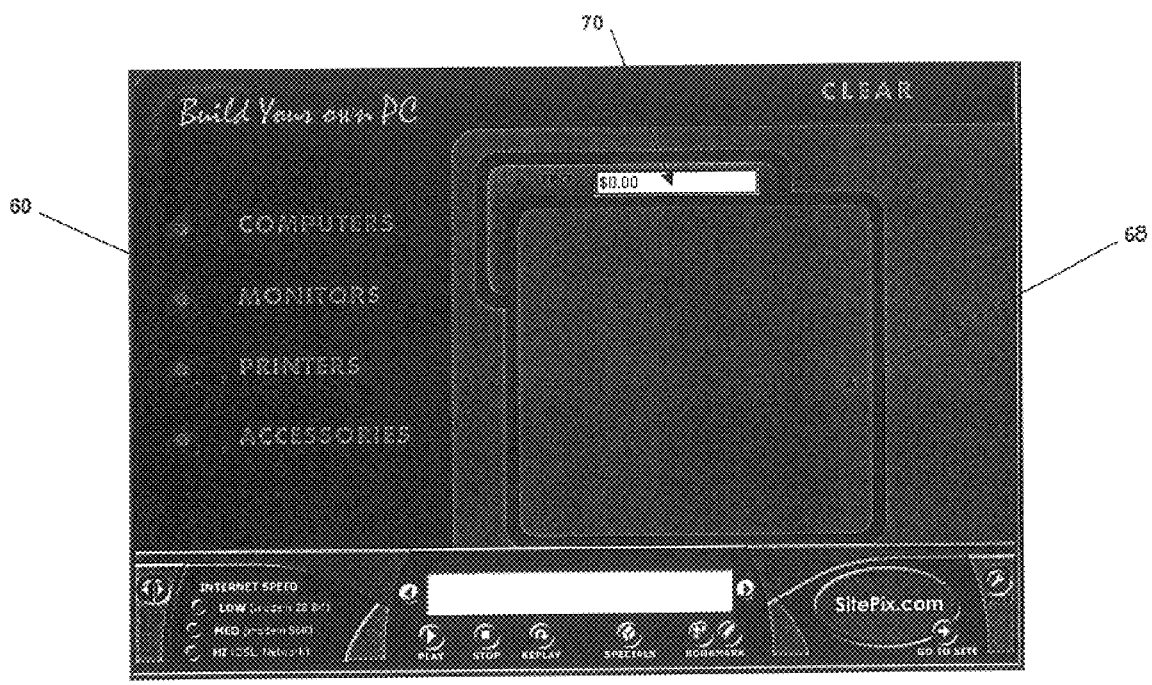
Figure 5B:
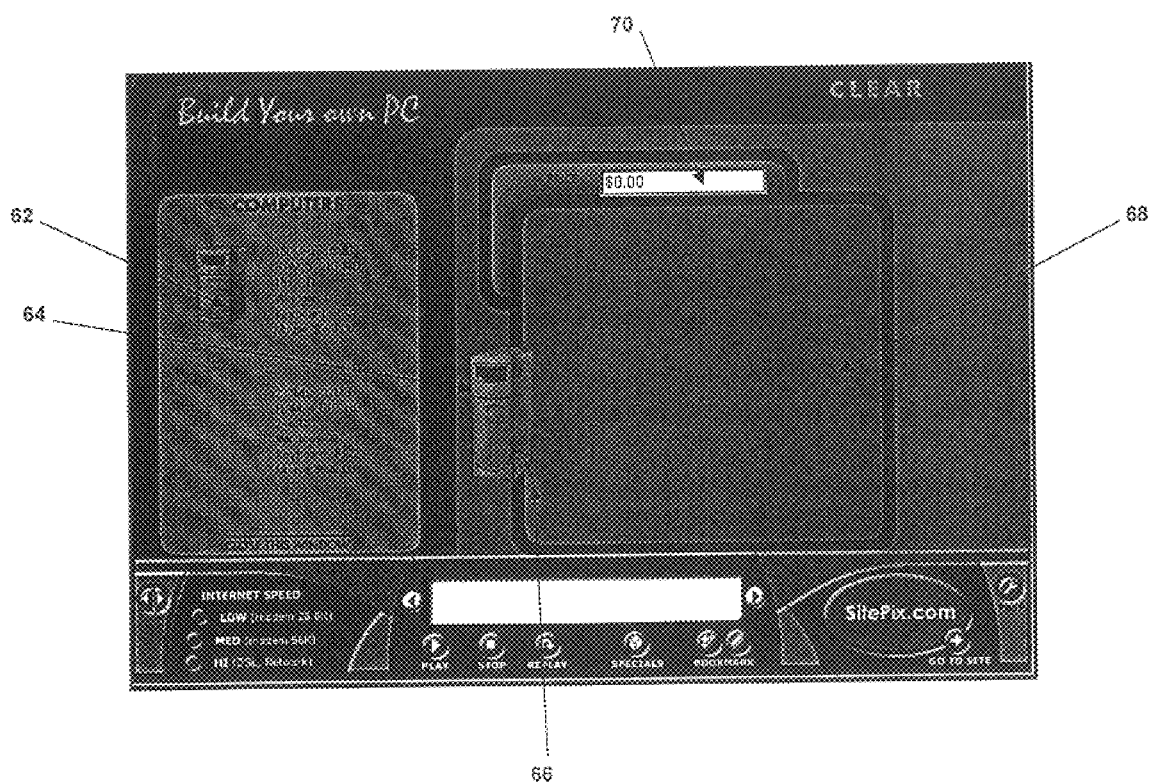
Figure 5C:
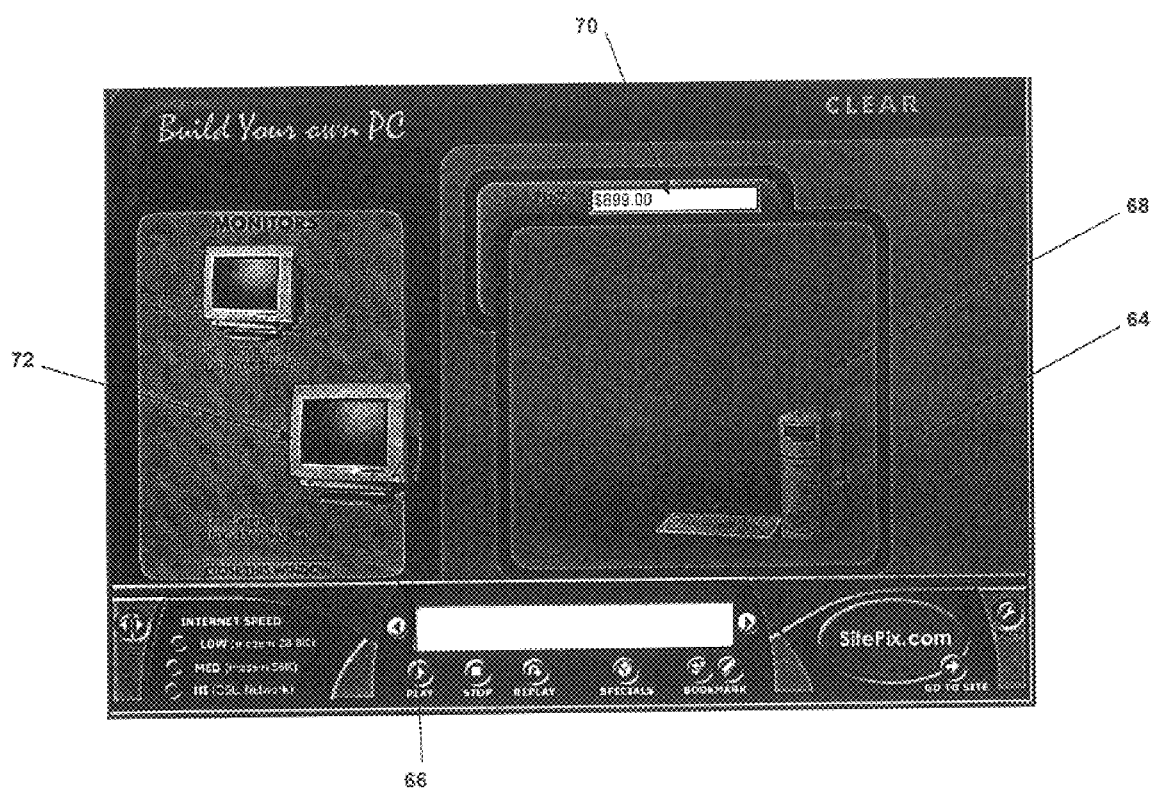
Figure 5D:
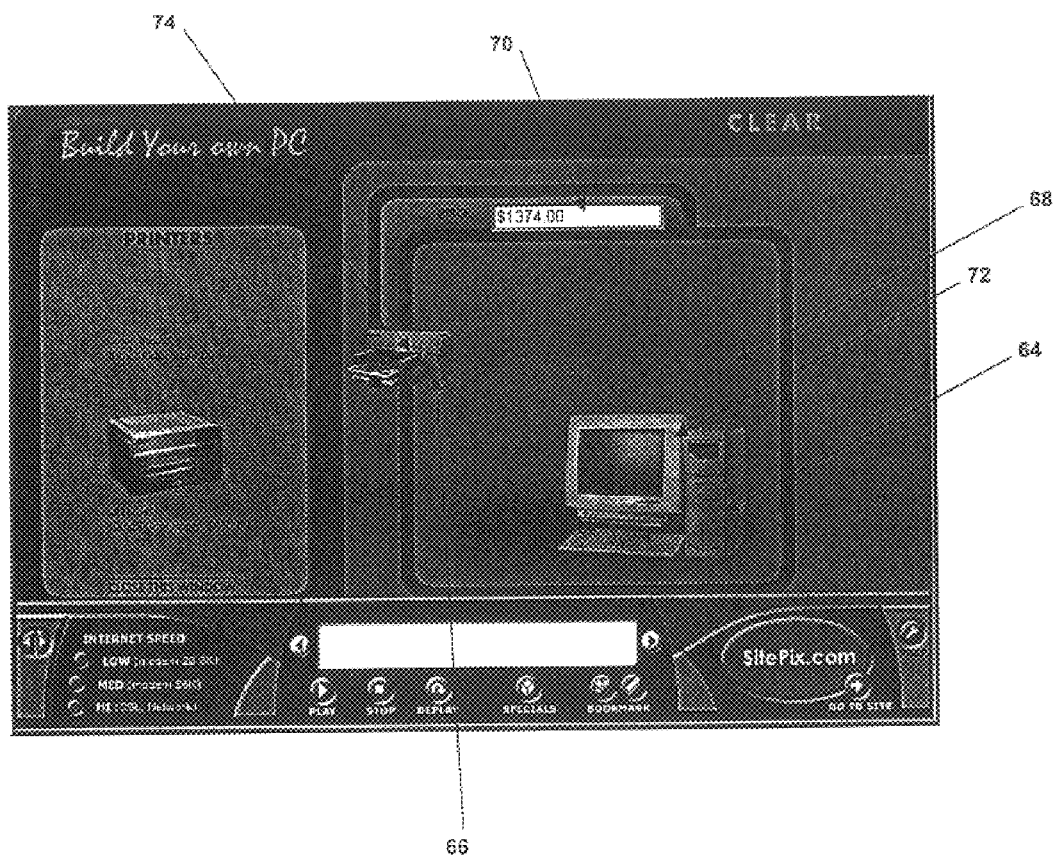
Figure 5E:
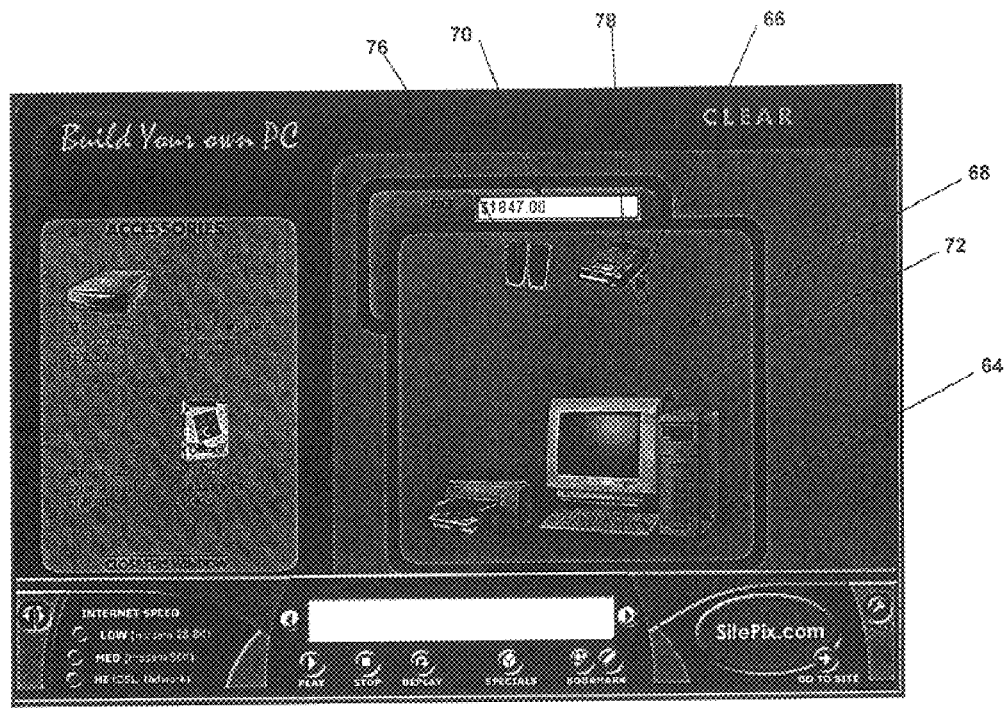

Referring now to FIG. 5A, another exemplary embodiment of a site feature with additional functionality is illustrated. The site feature in FIG. 5A includes an interactive, visual shopping cart module 60 that allows consumers and potential consumers to drag-and-drop products and components into a shopping cart, and then purchase those products and components directly through the site feature. For example, the site feature illustrated in FIG. 5A is designed to allow consumers to build-to-order a personal computer. Consumers are provided with the ability to select from various options under different component categories to customize their computer. For example, under the computer category, consumers are provided with the option of selecting from one of two different models, represented by graphical icons 62 and 64. To select one of the models, a consumer can simply click on the appropriate graphical icons (e.g., using cursor 66), drag the graphic over into the shopping cart window 68, and drop the graphic in the window, as illustrated in FIGS. 5B–5E. Each model has certain relevant data or information, such as price and technical specifications, integrated into its respective graphical icon. As a result, that data is continually associated the icon, regardless of its location on the Web. Therefore, when an icon is dragged into the shopping cart window, the price of the computer system is automatically updated in real-time using the relevant data associated with the graphic, and can be immediately displayed through a window 70 to the consumer. If, after selecting a particular model, the consumer changes his mind, he can simply click on the graphical representation of the other model, and drag-and-drop it into the shopping cart window. The site feature will automatically update the shopping cart, as well as the relevant data (e.g., price) associated with the consumer's new selection. Additionally, if a consumer desires to remove an item from his shopping cart, he can simply click on the graphical representation of the model, and drag-and-drop it into a trash can provided within the site feature. The consumer can follow a similar drag-and-drop process to select a particular monitor, printer and accessories for his consumer. For example, in FIG. 5C, the consumer has selected a particular monitor, represented by graphical icon 72, and is in the process of adding the monitor using the cursor 66 into the shopping cart window. In FIG. 5D, the consumer has selected a particular printer, represented by graphical icon 74, and is in the process of adding the printer using the cursor 66 into the shopping cart. In FIG. 5E, the consumer has selected particular accessories, represented by graphical icons 76 and 78, and is in the process of adding the accessories using cursor 66 to the shopping cart window. During each of these steps, the total price of the customized computer designed by the computer is continually updated in real-time as new selections are made, and displayed in window 70. Once the consumer has finished customizing his computer, he can click the BUY button provided within the site feature to purchase his build-to-order computer directly through the feature. Those skilled in the art should realize that the site feature illustrated and described above is only exemplary, and other functional enhancements can be additionally or alternatively integrated into the feature. For example, although only two choices of models are provided under each of the categories in the site feature, it should be readily apparent that any number of different choices and any number of different categories can be provided, depending on the particular requirements of the product or service featured.

Another functional enhancement that can be integrated into site previews and features is the ability to deploy the content in diverse applications on the Web. For example, the site preview illustrated in FIGS. 6A–6B is deployed directly on the advertiser's site that is being previewed. Referring now to FIG. 6A, a preview button 80 is positioned on the home page 82 of the advertiser, in this case ETOYS. When a visitor to the ETOYS site clicks on the preview button, the ETOYS site preview 84 is automatically launched, as illustrated in FIG. 6B. The site preview can either be launched in a separate pop-up window or directly within the home page of the advertiser. By deploying the site preview on its homepage, an advertiser can provide visitors to its site with a brief, introductory overview of the site, without requiring the visitor to try and manually navigate through the site. Those skilled in the art should realize that although the above description focused on deploying a site preview directly on an advertiser's site, site features can additionally or alternatively be deployed directly on an advertiser's site.

Figure 7A:
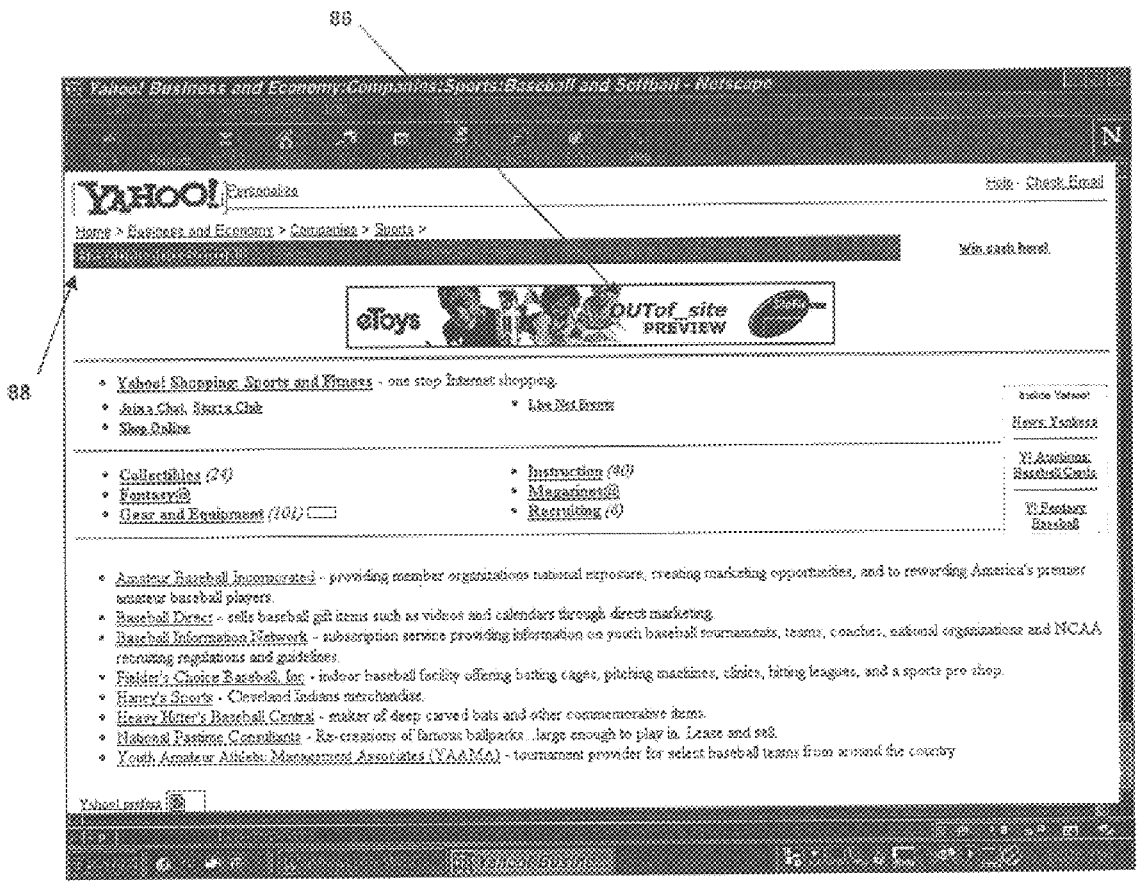
Figure 7B:
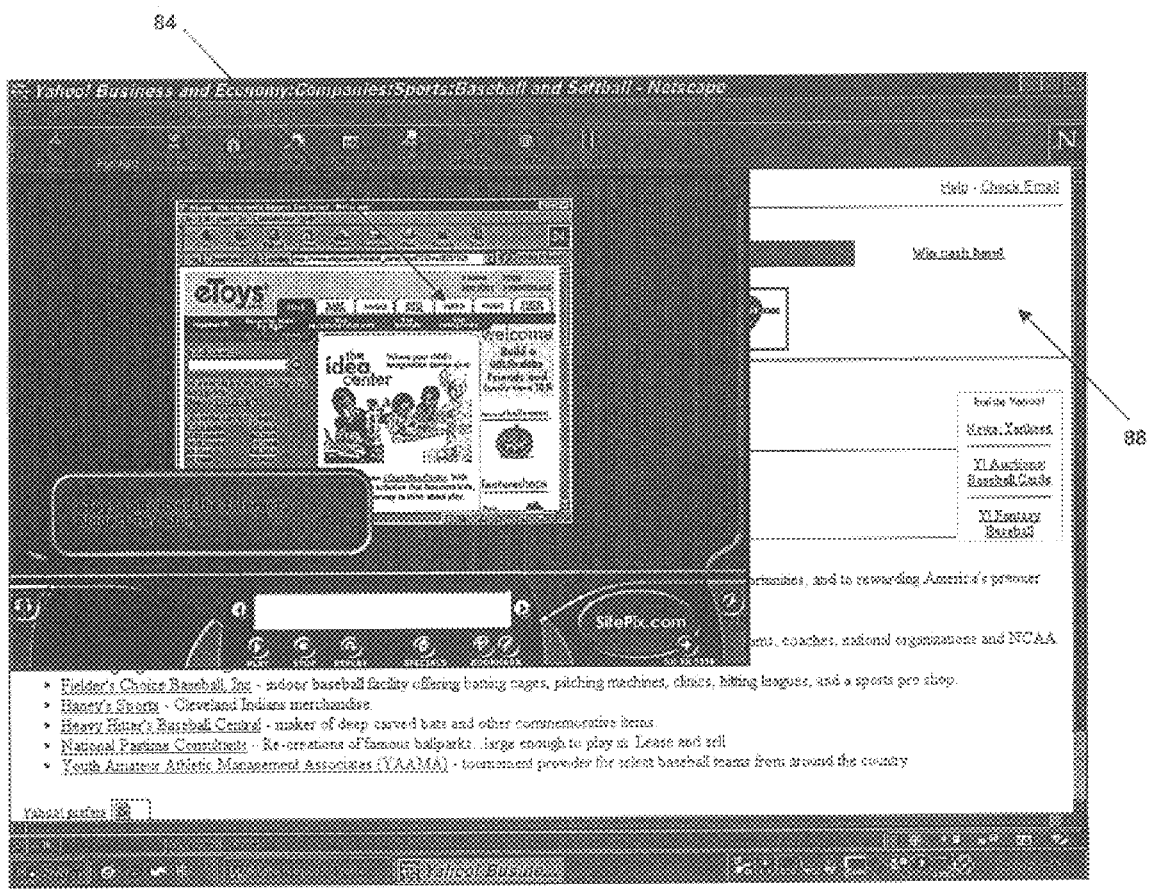
Figure 7C:
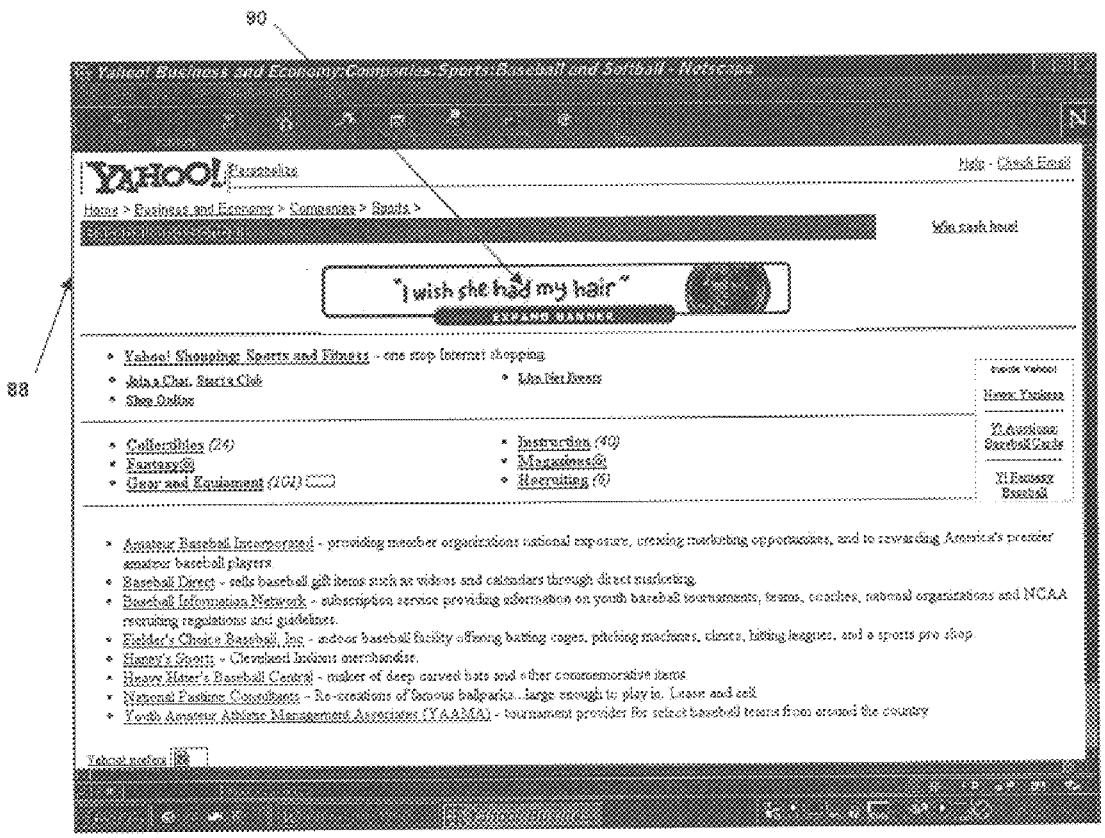
Figure 7D:
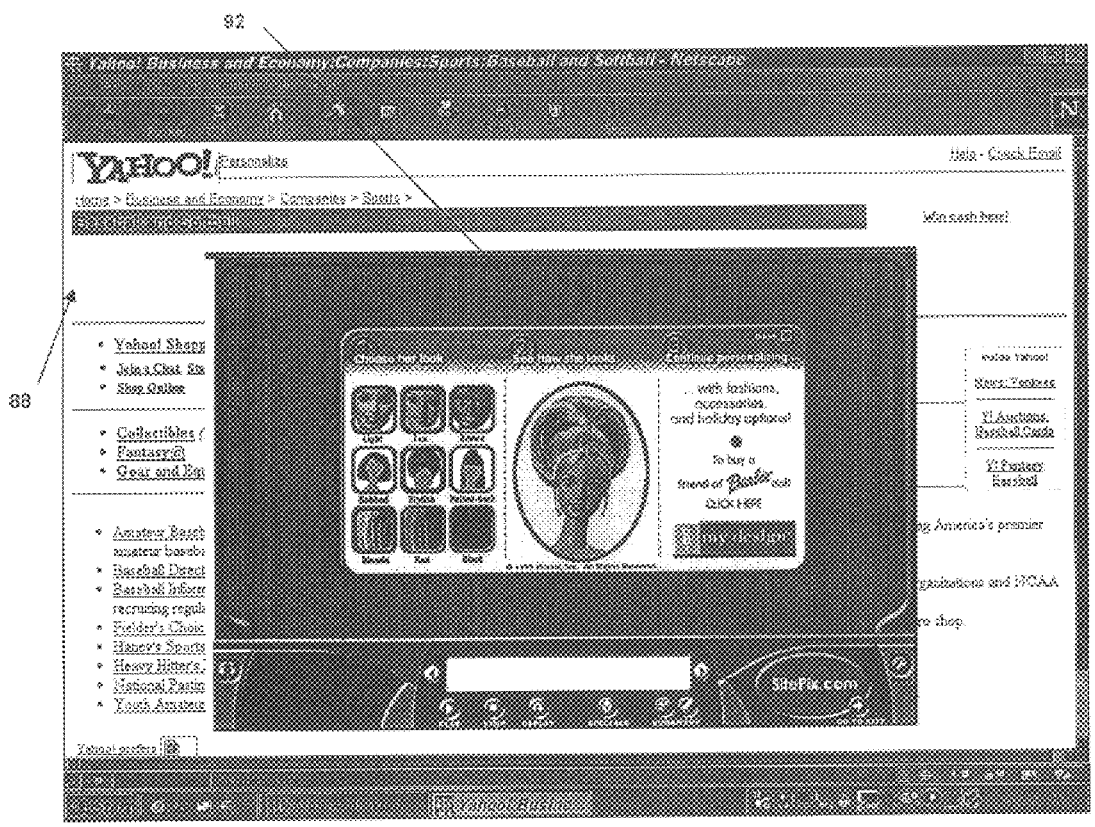
Figure 8A:
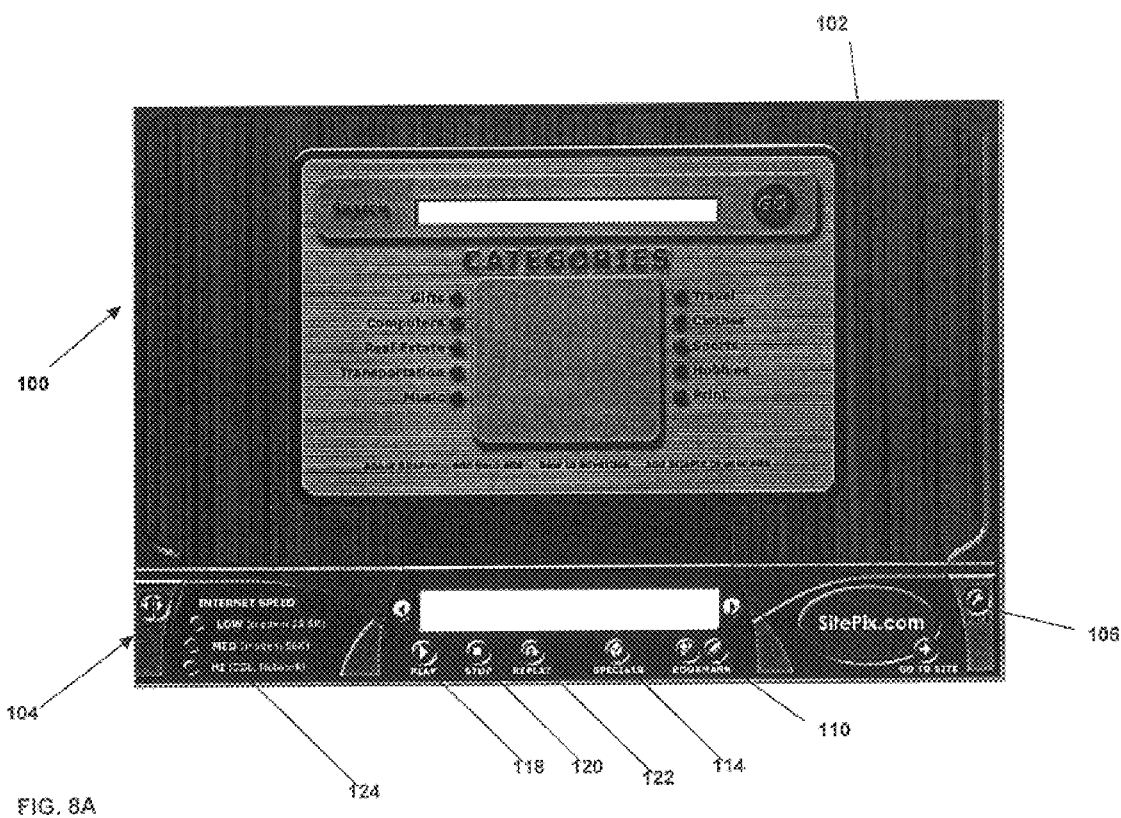
Figure 8B:
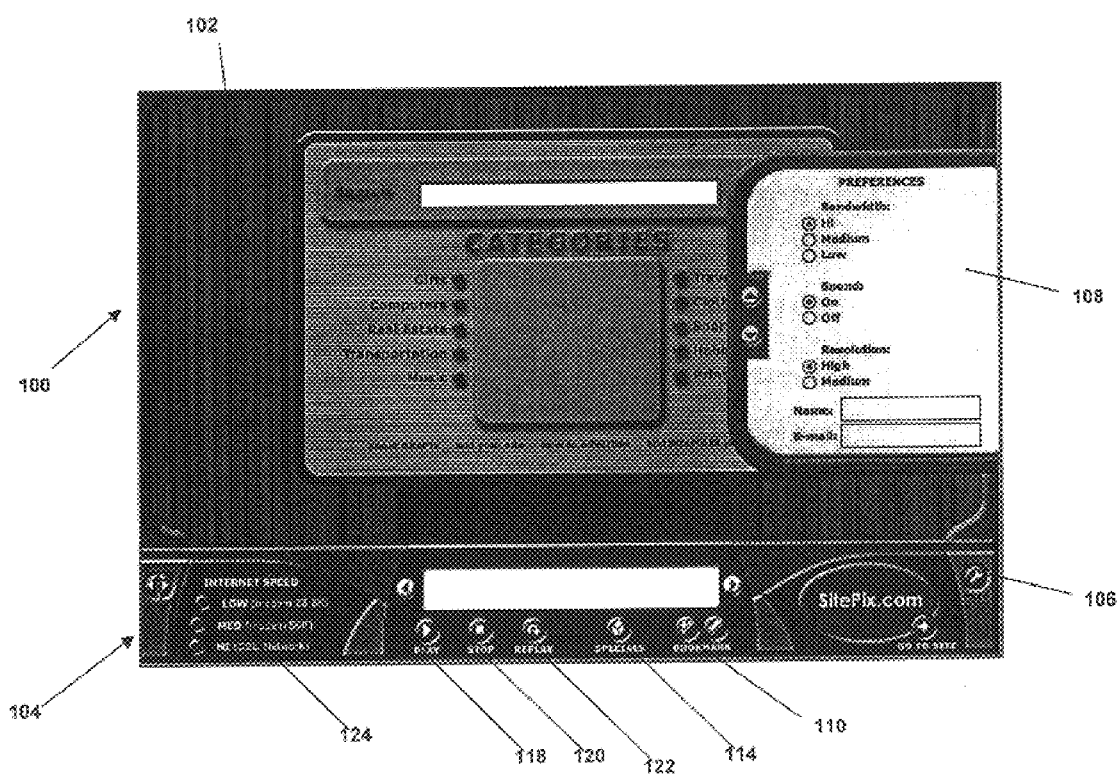
Figure 8C:
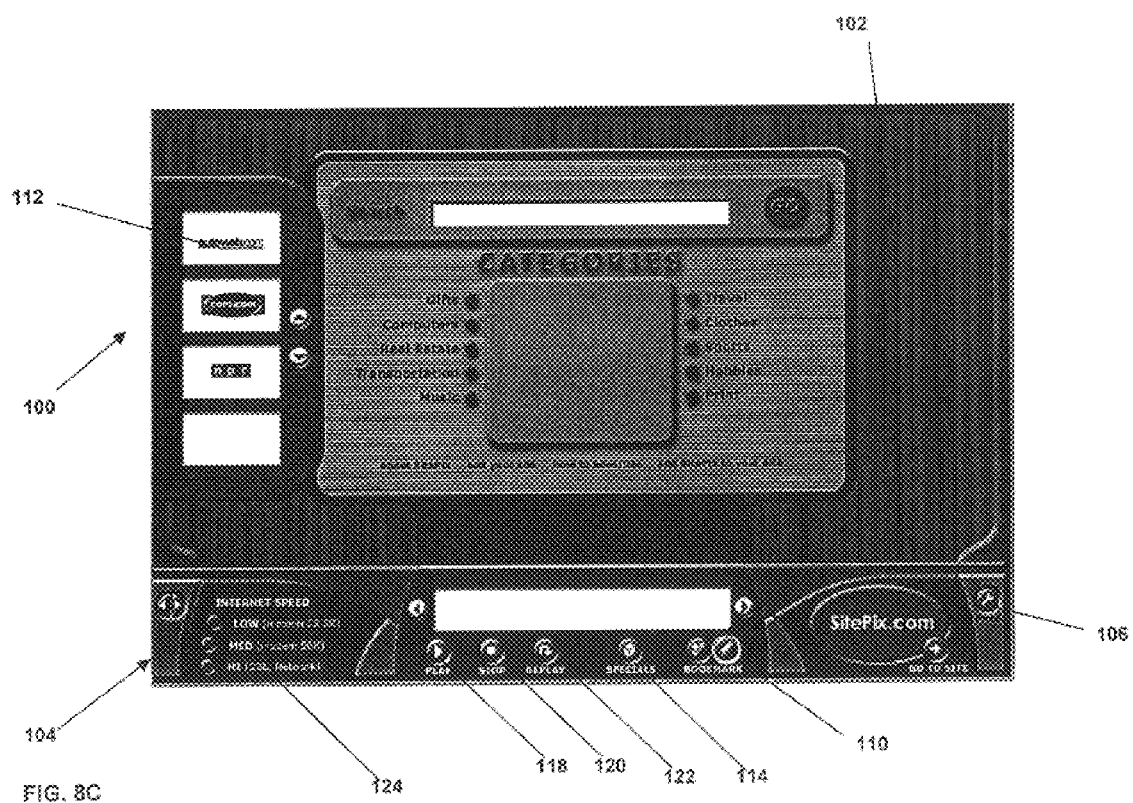
Figure 8D:
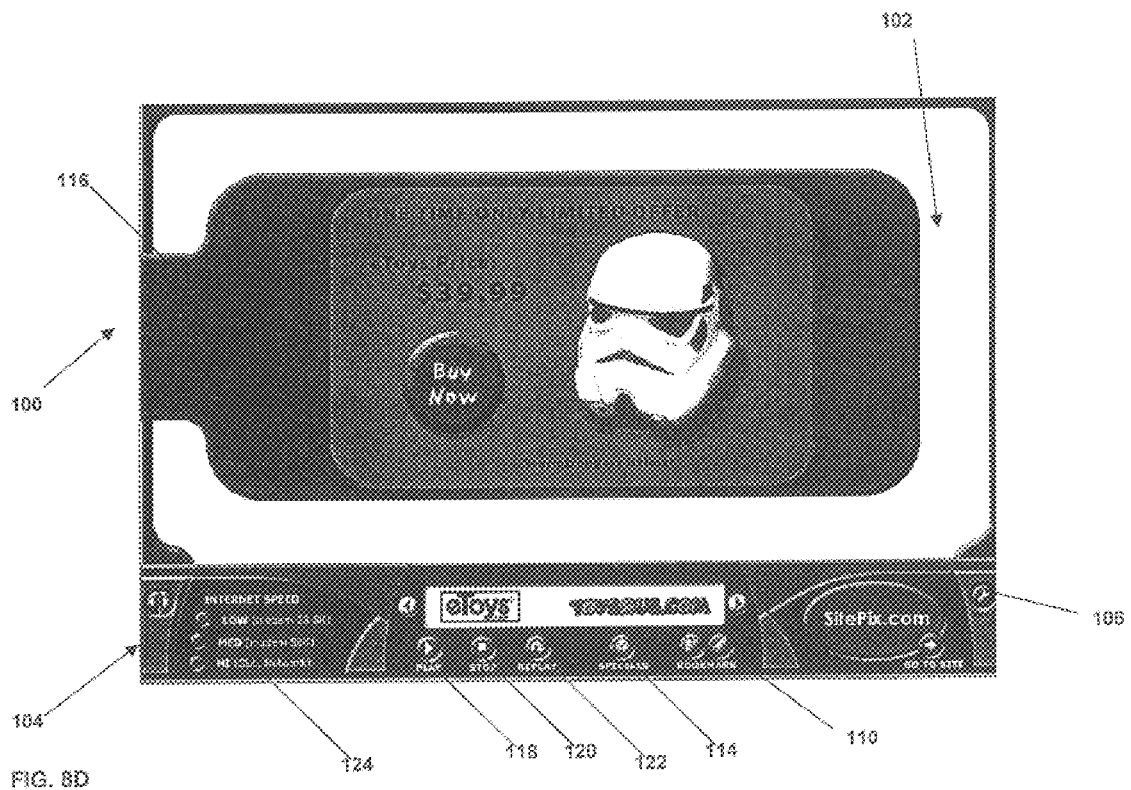

In addition to deploying site previews and features directly on advertiser's sites, the same content can simultaneously be deployed on third party sites. For example, referring now to FIG. 7A, the same ETOYS site preview is deployed in a banner advertisement 86 on a third party's site 88, in this case YAHOO.COM. When a visitor to the YAHOO site clicks on the banner advertisement, the ETOYS site preview 84 is automatically launched, as illustrated in FIG. 7B. The site preview can either be launched in a separate pop-up window or directly within the home page of the advertiser. By deploying the site preview in a banner advertisement on a third party site, an advertiser can visually and functionally extend the reach of its site to attract new visitors, and, hopefully, convert those visitors into consumers. Those skilled in the art should realize that although the above description focused on deploying a site preview on a third party site through the use of a banner advertisement, site features can additionally or alternatively be deployed in a similar manner. For example, referring now to FIG. 7C, a banner advertisement 90 incorporating the friend of BARBIE site feature previously described is illustrated. The site feature is deployed through the banner advertisement. When the banner advertisement is served onto the page 88, users only see a traditional banner advertisement (e.g., 12K, 480×60 pixels). However, when the user clicks on the banner advertisement 90 (e.g. EXPAND BANNER), it expands out into the full site feature 92 as illustrated in FIG. 7D. When the user is finished viewing or interacting with the site feature, he will once again only see a traditional banner advertisement, as illustrated in FIG. 7C. Again, by deploying a site feature in a banner advertisement on a third party site, an advertiser can visually and functionally extend the reach of its site to attract new visitors, and, hopefully, convert those visitors into consumers. Likewise, because the banner advertisement can expand into the site feature directly within the third party's site, the third party site can have consumers conduct transactions directly through the site feature without ever having to leave its site.

Although the functional enhancements provided through site features have been primarily described and illustrated as distinct components, those skilled in the art should realize that any of the functional enhancements can be combined and integrated with other functional enhancements to provide a more robust site feature. For example, one potential combination is to provide the ability to deploy a site feature within a banner advertisement in combination with the ability to conduct secure e-commerce transactions through that banner advertisement or site feature.

Viewer

The previews and features described above have been illustrated as being launched within a viewer 100. In a presently preferred embodiment, the previews and features stored within the database are always launched within the viewer, regardless of the online application through which they are accessed. Referring now to FIGS. 8A–8D, the viewer includes a viewing window 102 through which the previews and features can be watched, and a control panel 104, which provides users with additional features to control and customize their experience. For example, the control panel includes a preferences button 106, that allows users to specify and customize their preferences. Selecting the preference button provides access to a preference panel 108 (FIG. 8B), which allows users to specify their bandwidth, sound, and resolution preferences, as well as provide certain personal information such as name and e-mail address to the system. The control panel also includes a bookmark button 110, that allows users to review selected previews and features that have stored within the system or added to a favorites list. Selecting the bookmark button provides access to a favorites list 112 (FIG. 8C), where users can store their favorite previews or features to that they can be easily accessed at a later time. The control panel also includes a specials button 114, that allows users to directly access pre-selected features, such as updateable transaction panels, at any time (e.g., at the end of a preview). Selecting the specials button provides access to an updateable transaction panel 116 (FIG. 8D), similar to the ones previously described and illustrated in FIG. 3. Other buttons on the control panel include stop 118, play 120 and replay 122 buttons, which provide users with control over the viewing of previews and features within the viewer. Those skilled in the art should realize that the design configuration of the control panel illustrated herein is merely exemplary, and other features or designs can additionally or alternatively be added. For example, in addition to specifying certain preferences through the preference panel, users can be provided with the ability to specify their bandwidth preferences 124 directly on the control panel itself. Additionally or alternatively, the viewer can be designed to accommodate private label deployment of the preview and feature content provided for in the present application. In a presently preferred embodiment, the viewer is created using only DHTML and Javascript code, so that no download or plug-in is required on the client end to use the viewer. This code provides the functionality of the viewer that is described above, as well as allows the viewer to keep state (i.e., remember what the user has done before). However, those skilled in the art should realize that other proprietary viewers could alternatively be created that required an initial download or plug-in, and were eventually stored on the client end, to make additional features available to the client.

Applications For Site Previews and Features

As previously noted, one of the unique features of the method and system disclosed in the present application is that the same site preview and feature content can be simultaneously deployed in a variety of different online applications. Some of the exemplary online applications for the site preview and feature content disclosed herein include:

Visual Search Directory

In a presently preferred embodiment, the database of site previews and features is organized into a searchable directory. Consumers will be provided with an interface through which they can search the directory, by keywords, Boolean expressions, categories, etc. Results of the searches will be presented to the consumers through the interface in the form of relevant site previews and features matching the search criteria. In contrast to traditional search engines and directories where search results are presented in text-based, static manners, the visual search directory according to the present invention will provide consumers with search results in the form of interactive, multimedia content—site previews and features. Referring now to FIGS. 9A–9E, an exemplary embodiment of a visual search directory according to the present invention is illustrated. The embodiment of the visual search directory 130 illustrated in FIGS. 9A–9E is one that is primarily focused on the consumer e-commerce market. As a result, the site previews and features in the associated database are appropriately filtered so that only those site previews and features of consumer e-commerce companies are accessible through the search directory. However, the visual search directory provided for in the present application can additionally or alternatively be focused on other categories, such as business-to-business e-commerce, or specific vertical markets, such as travel.

The visual search directory is organized into a number of categories. In the embodiment illustrated in FIG. 9A, the categories correspond to the major online consumer e-commerce categories, such as Auctions, Arts & Collectibles, Automobiles, Kids & Babies, Books, Clothing & Accessories, Computers & Software, Electronics, Flowers & Gifts, Gourmet & Groceries, Health & Beauty, Home & Garden, Music & Videos, Office Products & Services, Pets, Sports & Fitness, Travel and Toys. Those skilled in the art should realize that these categories are merely illustrative, and that the search directory may additionally or alternatively be organized into different or more categories. Additionally, those skilled in the art should also realize that each category may additionally or alternatively be further organized into one or more sub-categories. For example, the Clothing & Accessories category may be further organized into Women's Clothing & Accessories, Men's Clothing & Accessories, and Children's Clothing & Accessories. The categories and sub-categories, however, are preferably selected as representative of the organization that a user of the search directory would expect, so as to make using the directory extremely intuitive. Each of the relevant site previews and features in the database is tagged with at least one category (and/or subcategory if relevant), so that they can be identified as relevant when the appropriate search is initiated. Those skilled in the art should also realize that other types of organizational systems using keywords or the like can additionally or alternatively be used with the present invention so as to create and maintain an easily and intuitively searchable directory of site previews and features.

An exemplary search using the visual search directory according to the present invention is illustrated in FIGS. 9B–9E. In FIG. 9B, a user interested in purchasing a toy online accesses the visual search directory and selects the Toys category 132 to initiate a search. Instead of selecting the Toys category, the user can alternatively enter the keyword "toys" into the search window 134 to initiate the search. The visual search directory accesses the database of site previews and features, and selects all of the relevant previews and features (e.g., all of the previews and features tagged with the keyword "toys"). In a presently preferred embodiment, the relevant previews and features are presented to users through a results window 136. For example, in the embodiment illustrated in FIG. 9C, the visual search directory has returned site previews for ETOYS 140 and TOYSRUS 142. Scrolling arrows 138 are provided to allow users to scroll through the search results.

The search results can be organized within the results window in a plurality of different manners. In a presently preferred embodiment, the search results are ranked using a pay-for-placement system similar to that used by GOTO-.COM. Advertisers can bid for priority placement in the search results. The advertiser with the highest bid is listed first in the search results, with the remaining advertiser appearing in descending bid amount order. Priority placement increases the likelihood that a consumer or potential consumer will elect to watch the preview, and hopefully click-through to the advertiser's site once the preview has finished. In a presently preferred embodiment, advertisers only pay the amount of their bid when a consumer or potential consumer clicks-through the preview to go to their site. Those skilled in the art should realize that other systems may additionally or alternatively be utilized to organize the search results. For example, the top results can be provided through the results window, and any remaining results can be accessed through a pop-up scrollable panel on the side of the viewer. This would allow more results to be presented through the search directory, while still placing a premium on appearing in the default results window.

Once the search results have been returned, the user is prompted to select which of the site previews or features the launch. In FIG. 9D, the user has selected to launch the ETOYS preview. In a presently preferred embodiment, the user can select 144 from different bandwidth versions of the preview or feature, depending on the type of Internet or network access they are using. For example, users accessing the visual search directory through traditional dial-up connections can select to view the low-bandwidth, non-audio preview; users accessing the directory through DSL, cable modem or other broadband connections can select to view the high-bandwidth, audio preview. If desired, a user can specify their preferences (e.g., low-bandwidth connection, non-audio previews), which can be stored using a cookie or other similar technology, so that the visual search directly can automatically launch the appropriate version of the preview or feature anytime that user accesses the directory.

Once the appropriate version of the preview or feature has been selected, either manually or automatically, the preview or feature will be launched by the visual search directory. In FIG. 9E, the ETOYS preview 84 has been launched by the directory. In a presently preferred embodiment, a hyperlink is included at the end of the preview to allow users to go directly to the advertiser's site. Additionally, in a presently preferred embodiment, another hyperlink is provided at the end of the preview to allow users to go directly to a specials section, where the advertiser can highlight or promote specific products or services using the updateable transaction panel previously described and illustrated, and allow the user to purchase the highlighted products or services in a secure manner, directly through the preview or feature, without ever having to leave the search directory. In addition to, or instead of, being located at the end of the preview, the direct link to the updateable transaction panel can also be located at the front of the panel, and users can preferably access the panel directly at any time by selecting a SPECIALS button 114 on the front of the user interface of the visual search directory. If the user is not ready or interested in going directly to the advertiser's site once he has finished watching the first preview, he can select any of the other previews from the result window 136.

As previously indicated, a presently preferred embodiment of the visual search directory is primarily focused on the consumer e-commerce market. The resulting value proposition to consumers is fairly straightforward. By focusing the search directory on the consumer e-commerce market, and preferably the top companies in that market, consumers no longer will no longer have to wade through hundreds or thousands of irrelevant search results that are returned by conventional search engines and directories. By presenting search results in the form of interactive, multimedia previews of web sits, consumers can develop an appreciation for the breadth and depth of sites without having to go directly to a site and navigate through the entire site. Additionally, by viewing and comparing the previews of several sites in a market category, consumers will be better able to select the site they want to visit. By presenting search results in the form of interactive, multimedia previews of sites that illustrate the features, capabilities and arrangement of the sites, first-time consumers will be provided with the instruction and information they need to feel comfortable about making their initial purchases online. By presenting search results in the form of interactive, multimedia previews of sites through which online companies can dynamically deliver new content such as specials, promotions or sales, repeat consumers will find the search directory to be a valuable resource for any online purchase that they are contemplating. By presenting search results in the form of interactive, multimedia previews of sites through which secure transactions can be conducted directly, consumers can complete their online shopping experience without ever having to leave the visual search directory. Similarly, the resulting value proposition to the online companies that service these consumers is also fairly straightforward. Through the use of interactive, multimedia previews in the visual search directory, these companies will be able to visually and functionally extend the reach of their sites in a manner which is simply not possible to date. Additionally, as described in more detail below, the same interactive, multimedia site preview and feature content that appears in the visual search directory can be simultaneously deployed in other online applications.

Online Customer Support

Another online application for the same multimedia site preview and content that appears in the visual search directory described above is in the online customer support industry. Many online companies offer different levels of customer support to consumers and potential consumers that access their site, either directly or through an outsourced third-party provided. For example, some companies offer consumers and potential consumers that access their site the ability to select from various customer support options including: one-to-one, real time live help via interactive chat, telephone support, personalized e-mail response, and self-help frequently-asked-question lists. As an additional customer support service, these companies can deploy their previews or features directly on their sites, so that consumers and potential consumers can automatically be provided with additional information about the site, product and service offerings by simply launching the previews or features. Referring now again to FIGS. 6A–6B, an exemplary application in the online customer support industry is illustrated, wherein ETOYS includes a preview button directly on its homepage. When a visitor to the ETOYS site selects the preview button, the ETOYS site preview is automatically launched. Additionally, the ETOYS site preview can be pushed to consumers and potential consumers during live chat, telephone or e-mail sessions with the customer support staff.

Site Reviews

Another online application for the same multimedia site preview and content that appears in the visual search directory described above is in the site review industry. For example, BIZRATE.COM is an independent rating guide that is build on the experience of actual online consumers. The BIZRATE.COM site combines valuable consumer information with other online e-commerce tools that help people find the store or product they want, as well as offers recommendations based on user-specified criteria. An exemplary BIZRATE.COM report for ETOYS 150 is illustrated in FIG. 10A. The report includes different categories that consumers and potential consumers can select for more information about ETOYS, such as performance review, store description, BIZRATE.COM certification, store features, return policy and contact information. Referring now to FIG. 11B, an exemplary application in the site review industry is illustrated, wherein the BIZRATE.COM report for ETOYS includes a preview button 152 in one of its categories, such as store features. When a visitor to the BIZRATE.COM ETOYS report selects the preview button, the ETOYS site preview 84 is automatically launched (FIG. 11C).

Online Banner Advertisement Networks

Another online application for the same multimedia site preview and content that appears in the visual search directory described above is in the online banner advertisement industry. For example, referring again to FIG. 7A, the same ETOYS site preview is deployed in a banner advertisement on a third party's site, in this case YAHOO. When a visitor to the YAHOO site clicks on the banner advertisement, the ETOYS site preview is automatically launched, as illustrated in FIG. 7BB. The site preview can either be launched in a separate pop-up window or directly within the home page of the advertiser. By deploying the site preview in a banner advertisement on a third party site, an advertiser can visually and functionally extend the reach of its site to attract new visitors, and, hopefully, convert those visitors into consumers. Referring now again to FIG. 7C, another exemplary application in the online banner advertisement industry is illustrated. In FIG. 7C, a banner advertisement incorporating the friend of BARBIE site feature previously described is illustrated. The site feature is deployed through the banner advertisement. When the banner advertisement is served onto the page, users only see a traditional banner advertisement (e.g., 480×60 pixels). However, when the user clicks on the banner advertisement, it expands out into the full site feature as illustrated in FIG. 7D.

Preview Marketing

Another online application for the same multimedia site preview and content that appears in the visual search directory described above is in the preview marketing industry. Although a primary use of the site previews and features in the present application is to provide an informative overview of a Web site, the previews and features can additionally or alternatively be designed to highlight new product or service offerings. By organizing these product or service previews and features into a searchable directory, consumers can be provided with an entertaining destination for discovering and previewing new products and services, much like FIRSTLOOK.COM presently does in the music industry. Those skilled in the art should realize that all of the functional enhancements described and illustrated above can be incorporated in the product or service previews and features designed for the preview marketing industry. For example, previews and features can be created for the new product offerings in the personal digital assistant (PDA) market. These previews and features can selectively integrate one or more functional enhancement including: transactional and data tracking capabilities, updateable transaction panel, interactive product customization, and interactive visual shopping cart. With these previews and features organized into a searchable directory or listing, consumers and potential consumers interested in purchasing a new PDA can learn more about each of the different products available, custom build the PDA to their preferences, and purchase their customized product all directly through the previews and features provided herein.

While various embodiments of the present invention have been shown and described, it would be apparent to those skilled in the art that many modifications are possible without departing from the inventive concept disclosed herein. For example, although the present invention has been described and illustrated using specific examples of preview and feature content that can be deployed in a variety of online application, those skilled in the art should realize that the content contained with the previews and features of the system can be designed or customized to relay any information desired important by the company profiled in the preview or feature. As a result, different previews and features can be created to address all aspects of customer relationship management, from customer acquisition, to customer support and service, and through post-sales retention and growth. Additionally, although the present invention has been described and illustrated using specific multimedia formats, those skilled in the art should realize that any other suitable multimedia format can be used depending on the particular features required for the application. It is therefore to be understood that this invention may be practiced otherwise than as specifically described.

What is claimed is:

1. A visual search directory comprising:
    a plurality of animated, multimedia previews;
    a database organizing the plurality of animated, multimedia previews into a searchable directory;
    an interface through which a user can access the directory, perform a search using at least one search criteria, and retrieve search results from the directory;
    wherein the plurality of animated, multimedia previews comprises a plurality of animated, multimedia previews of web sites, products or services, and wherein the retrieved search results are presented to the user in the form of animated, multimedia previews of relevant web sites, products or services based on the at least one search criteria;
    wherein the plurality of animated, multimedia previews further comprises a plurality of interactive, animated, multimedia previews having at least one functional capability; and
    wherein the at least one functional capability comprises the ability to interactively drag-and-drop products into a visual shopping cart within the interactive, animated, multimedia previews.

2. The visual search directory according to claim 1 wherein the at least one functional capability comprises the ability to conduct secure transactions within the interactive, animated, multimedia previews.

3. The visual search directory according to claim 1 wherein the at least one functional capability comprises the ability to capture data within the interactive, animated, multimedia previews.

4. The visual search directory according to claim 1 wherein the at least one functional capability comprises the ability to dynamically update the interactive, animated, multimedia previews.

5. The visual search directory according to claim 1 wherein the at least one functional capability comprises the ability to interactively customize a product or service within the interactive, animated, multimedia previews.

6. The visual search directory according to claim 1 further comprising a priority placement system for generating a ranking order in which the retrieved search results are presented to the user.

7. The visual search directory according to claim 6 further comprising a bidding system for allowing advertisers to submit bids for priority placement within the retrieved search results, and
    wherein the priority placement system generates the ranking order based on the bids submitted through the bidding system.

8. A method for providing a visual search directory, the method comprising the steps of:
    a plurality of animated, multimedia previews;
    organizing the plurality of animated, multimedia previews into a searchable directory;
    providing an interface through which a user can access the directory, perform a search using at least one search criteria, and retrieve search results from the directory;
    wherein the plurality of animated, multimedia previews comprises a plurality of animated, multimedia previews of web sites, products or services, and wherein the retrieved search results are presented to the user in the form of animated, multimedia previews of relevant web sites, products or services based on the at least one search criteria;
    wherein the plurality of animated, multimedia previews further comprises a plurality of interactive, animated, multimedia previews having at least one functional capability; and
    wherein the at least one functional capability comprises the ability to interactively drag-and-drop products into a visual shopping cart within the interactive, animated, multimedia previews.

9. The method according to claim 8 wherein the step of providing a plurality of previews further comprises providing a plurality of interactive, animated, multimedia previews having at least one functional capability selected from the group comprising:
    the ability to conduct secure transactions within the interactive, animated, multimedia previews; the ability to capture data within the interactive, animated, multimedia previews; the ability to dynamically update the interactive, animated, multimedia previews; the ability to interactively customize a product or service within the interactive, animated, multimedia previews; and the ability to interactively drag-and-drop products into a visual shopping cart within the interactive, animated, multimedia previews.

10. The method according to claim 8 further comprising the step of ranking the order in which the retrieved search results are presented to the user based on bids submitted by advertisers for priority placement within the retrieved search results.

11. A visual search directory comprising:
    means for storing a plurality of animated, multimedia previews;

means for organizing the plurality of animated, multimedia previews into a searchable directory;

means for accessing the directory to perform a search using at least one search criteria;

means for retrieving search results from the directory; and means for presenting the retrieved search results to a user;

wherein the means for storing a plurality of animated, multimedia previews comprises a plurality of animated, multimedia previews of web sites, products or services, and wherein the means for presenting the retrieved search results comprises the results being presented to the user in the form of animated, multimedia previews of relevant web sites, products or services based on the at least one search criteria;

wherein the means for storing a plurality of animated, multimedia previews further comprises a plurality of interactive, animated, multimedia previews having at least one functional capability; and wherein the at least one functional capability comprises the ability to interactively drag-and-drop products into a visual shopping cart within the interactive, animated, multimedia previews.

12. The visual search directory according to claim 11 wherein the plurality of animated, multimedia previews further comprises a plurality of interactive, animated, multimedia previews having at least one functional capability selected from the group comprising:

the ability to conduct secure transactions within the interactive, animated, multimedia previews; the ability to capture data within the interactive, animated, multimedia previews; the ability to dynamically update the interactive, animated, multimedia previews; the ability to interactively customize a product or service within the interactive, animated, multimedia previews; and the ability to interactively drag-and-drop products into a visual shopping cart within the interactive, animated, multimedia previews.

13. The visual search directory according to claim 11 further comprising:

means for advertisers to submit bids for priority placement in retrieved search results, and means for generating a ranking order in which the retrieved search results are presented to the user, wherein the ranking order is generated based on bids submitted by advertisers.

* * * * *